(12) United States Patent
Shkedi

(10) Patent No.: US 9,351,053 B2
(45) Date of Patent: *May 24, 2016

(54) TARGETED TELEVISION ADVERTISING BASED ON A PROFILE LINKED TO AN ONLINE DEVICE ASSOCIATED WITH A CONTENT-SELECTING DEVICE

(71) Applicant: ALMONDNET, INC., Long Island City, NY (US)

(72) Inventor: Roy Shkedi, Forest Hills, NY (US)

(73) Assignee: Almondnet, Inc., Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,672

(22) Filed: Jun. 26, 2015

(65) Prior Publication Data

US 2015/0296271 A1 Oct. 15, 2015

Related U.S. Application Data

(63) Continuation of application No. 13/906,211, filed on May 30, 2013, now Pat. No. 9,071,886.

(60) Provisional application No. 61/655,951, filed on Jun. 5, 2012.

(51) Int. Cl.
| | |
|---|---|
| *H04N 21/258* | (2011.01) |
| *H04N 21/81* | (2011.01) |
| *H04N 21/45* | (2011.01) |
| *H04N 21/234* | (2011.01) |
| *H04N 21/2668* | (2011.01) |
| *G06Q 30/02* | (2012.01) |

(52) U.S. Cl.
CPC ......... *H04N 21/812* (2013.01); *G06Q 30/0261* (2013.01); *G06Q 30/0269* (2013.01); *H04N 21/23424* (2013.01); *H04N 21/25808* (2013.01); *H04N 21/25825* (2013.01); *H04N 21/25841* (2013.01); *H04N 21/25891* (2013.01); *H04N 21/2668* (2013.01); *H04N 21/4516* (2013.01); *H04N 21/4524* (2013.01)

(58) Field of Classification Search
CPC .................. H04N 21/25808; H04N 21/25825; H04N 21/2668; H04N 21/25841
See application file for complete search history.

(56) References Cited

U.S. PATENT DOCUMENTS

| | | | |
|---|---|---|---|
| 5,848,396 A | 12/1998 | Gerace | |
| 5,855,008 A | 12/1998 | Goldhaber et al. | |
| 5,933,811 A | 8/1999 | Angles et al. | |
| 5,948,061 A | 9/1999 | Merriman | |
| 6,160,989 A | 12/2000 | Hendricks et al. | |
| 6,216,129 B1 | 4/2001 | Eldering | |
| 6,366,298 B1 | 4/2002 | Haitsuka et al. | |
| 6,377,986 B1 | 4/2002 | Philyaw et al. | |
| 6,385,592 B1 | 5/2002 | Angles et al. | |
| 6,446,261 B1 | 9/2002 | Rosser | |
| 6,536,041 B1 | 3/2003 | Knudson et al. | |
| 6,684,194 B1 | 1/2004 | Eldering et al. | |
| 6,718,551 B1 | 4/2004 | Swix et al. | |
| 6,771,290 B1 | 8/2004 | Hoyle | |
| 6,832,207 B1 | 12/2004 | Shkedi | |
| 6,845,396 B1 | 1/2005 | Kanojia | |
| 6,868,392 B1 | 3/2005 | Ogasawara | |
| 6,925,440 B1 | 8/2005 | Shkedi | |
| 6,973,436 B1 | 12/2005 | Shkedi | |
| 7,072,853 B2 | 7/2006 | Shkedi | |
| 7,092,926 B2 | 8/2006 | Cerrato | |
| 7,100,183 B2 | 8/2006 | Kunkel et al. | |
| 7,152,237 B2 | 12/2006 | Flickinger et al. | |
| 7,260,823 B2 | 8/2007 | Schlack et al. | |
| 7,370,073 B2 | 5/2008 | Yen et al. | |
| 7,428,493 B2 | 9/2008 | Shkedi | |
| 7,454,364 B2 | 11/2008 | Shkedi | |
| 7,739,140 B2 | 6/2010 | Vinson et al. | |
| 7,747,745 B2 | 6/2010 | Shkedi | |
| 7,818,763 B2 | 10/2010 | Sie et al. | |
| 7,822,637 B2 | 10/2010 | Shkedi | |
| 7,822,639 B2 | 10/2010 | Shkedi | |
| 7,856,372 B2 | 12/2010 | Ullah | |
| 7,856,373 B2 | 12/2010 | Ullah | |
| 7,861,260 B2 | 12/2010 | Shkedi | |
| 7,890,609 B2 | 2/2011 | Shkedi | |
| 7,900,229 B2 | 3/2011 | Dureau | |

(Continued)

FOREIGN PATENT DOCUMENTS

| | | |
|---|---|---|
| KR | 10-0793513 | 1/2008 |
| WO | WO 02/19720 | 3/2002 |
| WO | WO 2005/046237 | 5/2005 |

OTHER PUBLICATIONS

Battele, John; "The Search—How Google and Its Rivals Rewrote the Rules of Business and Transformed Our Culture"; pp. 167-171; 2005.

(Continued)

*Primary Examiner* — Robert Hance
(74) *Attorney, Agent, or Firm* — Louis J Hoffman, P.C.; Louis J. Hoffman; David S. Alavi

(57) ABSTRACT

A profile provider: (i) associates a set of devices (including two or more online devices and possibly a set-top box); and (ii) delivers an advertisement targeted using profile information associated with one of the online devices. The advertisement is presented along with media content. If the media content is viewed using a single-viewer display, then profile information is used that is associated with an online device used to select or receive the media content. If the media content is viewed using a multiple-viewer display, then profile information is used that is associated with an online device used to select, receive, or present the media content or with an online device associated with one or more of those online devices.

22 Claims, No Drawings

(56) References Cited

U.S. PATENT DOCUMENTS

| | | |
|---|---|---|
| 7,937,383 B2 | 5/2011 | Hintze et al. |
| 7,979,307 B2 | 7/2011 | Shkedi |
| 8,015,286 B2 | 9/2011 | Jenkins |
| 8,024,765 B2 | 9/2011 | Ramanathan et al. |
| 8,051,444 B2 | 11/2011 | Shkedi |
| 8,086,491 B1 | 12/2011 | Matz et al. |
| 8,200,822 B1 | 6/2012 | Shkedi |
| 8,204,783 B2 | 6/2012 | Shkedi |
| 8,204,965 B2 | 6/2012 | Shkedi |
| 8,239,264 B2 | 8/2012 | Shkedi |
| 8,244,574 B2 | 8/2012 | Shkedi |
| 8,244,582 B2 | 8/2012 | Shkedi |
| 8,244,583 B2 | 8/2012 | Shkedi |
| 8,244,586 B2 | 8/2012 | Shkedi |
| 8,280,758 B2 | 10/2012 | Shkedi |
| 8,281,336 B2 | 10/2012 | Shkedi |
| 8,341,247 B2 | 12/2012 | Shkedi |
| 8,494,904 B2 | 7/2013 | Shkedi |
| 8,522,271 B2 | 8/2013 | Childress et al. |
| 8,566,164 B2 | 10/2013 | Shkedi et al. |
| 8,589,210 B2 | 11/2013 | Shkedi |
| 8,595,069 B2 | 11/2013 | Shkedi et al. |
| 8,600,815 B2 | 12/2013 | Shkedi |
| 8,607,267 B2 | 12/2013 | Shkedi |
| 8,671,139 B2 | 3/2014 | Shkedi |
| 8,677,398 B2 | 3/2014 | Shkedi |
| 8,683,502 B2 | 3/2014 | Shkedi et al. |
| 8,695,032 B2 | 4/2014 | Shkedi |
| 8,713,600 B2 | 4/2014 | Shkedi |
| 8,775,249 B2 | 7/2014 | Shkedi |
| 8,959,146 B2 | 2/2015 | Shkedi |
| 8,997,138 B2 | 3/2015 | Shkedi |
| 2001/0003184 A1 | 6/2001 | Ching et al. |
| 2002/0013943 A1 | 1/2002 | Haberman et al. |
| 2002/0032603 A1 | 3/2002 | Yeiser |
| 2002/0078444 A1 | 6/2002 | Krewin et al. |
| 2002/0082910 A1 | 6/2002 | Kontogouris |
| 2002/0083043 A1* | 6/2002 | Hoshi ............... G06F 17/30867 |
| 2002/0083443 A1 | 6/2002 | Eldering et al. |
| 2002/0120933 A1 | 8/2002 | Knudson et al. |
| 2002/0123928 A1 | 9/2002 | Eldering et al. |
| 2002/0124249 A1 | 9/2002 | Shintani |
| 2002/0124253 A1 | 9/2002 | Eyer et al. |
| 2002/0129362 A1 | 9/2002 | Chang et al. |
| 2002/0129368 A1 | 9/2002 | Schlack et al. |
| 2002/0194058 A1 | 12/2002 | Eldering |
| 2002/0194604 A1 | 12/2002 | Sanchez et al. |
| 2003/0028871 A1* | 2/2003 | Wang ................ H04H 60/65 725/9 |
| 2003/0051242 A1 | 3/2003 | Donnelly |
| 2003/0066078 A1 | 4/2003 | Bjorgan et al. |
| 2003/0083938 A1 | 5/2003 | Smith et al. |
| 2003/0093792 A1 | 5/2003 | Labeeb et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0208756 A1 | 11/2003 | Macrae et al. |
| 2003/0208758 A1 | 11/2003 | Schein et al. |
| 2003/0221191 A1 | 11/2003 | Khusheim |
| 2003/0229900 A1 | 12/2003 | Reisman |
| 2004/0010546 A1 | 1/2004 | Klug et al. |
| 2004/0031058 A1 | 2/2004 | Reisman |
| 2004/0073915 A1 | 4/2004 | Dureau |
| 2004/0078809 A1 | 4/2004 | Drazin |
| 2004/0107437 A1 | 6/2004 | Reichardt et al. |
| 2004/0117827 A1 | 6/2004 | Karaoguz et al. |
| 2004/0163101 A1 | 8/2004 | Swix et al. |
| 2004/0172650 A1 | 9/2004 | Hawkins et al. |
| 2005/0086112 A1 | 4/2005 | Shkedi |
| 2005/0108776 A1 | 5/2005 | Carver et al. |
| 2005/0125290 A1 | 6/2005 | Beyda et al. |
| 2005/0165638 A1 | 7/2005 | Piller |
| 2005/0165643 A1 | 7/2005 | Wilson et al. |
| 2005/0165644 A1 | 7/2005 | Beyda et al. |
| 2005/0187823 A1 | 8/2005 | Howes |
| 2005/0246736 A1 | 11/2005 | Beyda et al. |
| 2005/0283796 A1 | 12/2005 | Flickinger |
| 2006/0074769 A1 | 4/2006 | Looney et al. |
| 2006/0116924 A1 | 6/2006 | Angles et al. |
| 2006/0183467 A1 | 8/2006 | Stewart |
| 2006/0212900 A1 | 9/2006 | Ismail et al. |
| 2006/0248570 A1 | 11/2006 | Witwer |
| 2006/0253323 A1 | 11/2006 | Phan et al. |
| 2006/0271953 A1 | 11/2006 | Jacoby et al. |
| 2006/0277569 A1 | 12/2006 | Smith |
| 2006/0287916 A1 | 12/2006 | Starr et al. |
| 2007/0022032 A1 | 1/2007 | Anderson et al. |
| 2007/0038516 A1 | 2/2007 | Apple et al. |
| 2007/0073585 A1 | 3/2007 | Apple et al. |
| 2007/0089127 A1 | 4/2007 | Flickinger et al. |
| 2007/0100690 A1 | 5/2007 | Hopkins |
| 2007/0180469 A1 | 8/2007 | Finley et al. |
| 2007/0198532 A1 | 8/2007 | Krikorian et al. |
| 2007/0204297 A1 | 8/2007 | Gonzalez |
| 2007/0208619 A1 | 9/2007 | Branam et al. |
| 2007/0220553 A1 | 9/2007 | Branam |
| 2007/0266400 A1 | 11/2007 | Rogers et al. |
| 2007/0266403 A1 | 11/2007 | Ou et al. |
| 2007/0277220 A1 | 11/2007 | Shikuma et al. |
| 2007/0283384 A1 | 12/2007 | Haeuser et al. |
| 2007/0294721 A1 | 12/2007 | Haeuser et al. |
| 2008/0016540 A1 | 1/2008 | Savoor et al. |
| 2008/0040742 A1 | 2/2008 | Howcroft et al. |
| 2008/0072249 A1 | 3/2008 | Hovnanian et al. |
| 2008/0109306 A1 | 5/2008 | Maigret et al. |
| 2008/0109843 A1* | 5/2008 | Ullah .................. G06Q 30/02 725/34 |
| 2008/0181225 A1 | 7/2008 | Zampiello |
| 2008/0189360 A1 | 8/2008 | Kiley et al. |
| 2008/0243822 A1 | 10/2008 | Campbell et al. |
| 2008/0244076 A1 | 10/2008 | Shah et al. |
| 2008/0244665 A1* | 10/2008 | Bowen ................ H04N 7/163 725/83 |
| 2008/0262901 A1 | 10/2008 | Banga et al. |
| 2008/0275785 A1 | 11/2008 | Altberg et al. |
| 2008/0281699 A1 | 11/2008 | Whitehead |
| 2009/0007171 A1 | 1/2009 | Casey et al. |
| 2009/0037949 A1 | 2/2009 | Birch |
| 2009/0049468 A1 | 2/2009 | Shkedi |
| 2009/0049469 A1 | 2/2009 | Small et al. |
| 2009/0106100 A1 | 4/2009 | Mashinsky |
| 2009/0172723 A1 | 7/2009 | Shkedi et al. |
| 2009/0199230 A1 | 8/2009 | Kumar et al. |
| 2009/0210898 A1* | 8/2009 | Childress ............ H04H 60/46 725/34 |
| 2009/0265734 A1 | 10/2009 | Dion et al. |
| 2010/0058383 A1 | 3/2010 | Chang et al. |
| 2010/0076848 A1 | 3/2010 | Stefanik et al. |
| 2010/0175078 A1 | 7/2010 | Knudson et al. |
| 2010/0229194 A1* | 9/2010 | Blanchard ........... G06F 3/038 725/39 |
| 2011/0035256 A1 | 2/2011 | Shkedi et al. |
| 2011/0040607 A1 | 2/2011 | Shkedi |
| 2011/0167043 A1 | 7/2011 | Hintze et al. |
| 2011/0258049 A1 | 10/2011 | Ramer et al. |
| 2011/0321083 A1 | 12/2011 | Rouse et al. |
| 2012/0023522 A1 | 1/2012 | Anderson et al. |
| 2012/0060176 A1* | 3/2012 | Chai .................... H04H 60/45 725/10 |
| 2012/0066385 A1 | 3/2012 | Jenkins |
| 2012/0096489 A1 | 4/2012 | Shkedi |
| 2012/0159538 A1* | 6/2012 | Phillips .............. H04N 21/2221 725/34 |
| 2013/0276010 A1* | 10/2013 | Drayson ........... H04N 21/44222 725/14 |

OTHER PUBLICATIONS

"BSkyB in Google Link-up"; Financial Times (FT.com); Dec. 6, 2006.

"Cable's Big Bet on Hyper-Targeting. Time Warner will test new software that sends different ads to different viewers."; BusinessWire online; Jul. 4, 2005.

(56) References Cited

OTHER PUBLICATIONS

Chen, Andy; "The New Behavioral Wunder"; from webpage http://www.clickz.com; Apr. 11, 2007.
"Google moves into TV ads with BSkyB"; Guardian Unlimited; Dec. 7, 2006.
Keegan, Paul; "The Man Who Can Save Advertising"; from http://money.cnn.com; Nov. 1, 2004.
Shukla, Anuradha; "Visible World Offers 'Any Screen' Solution for Customized Video Advertising"; from www.tmcnet.com; Feb. 6, 2007.
Story, Louise; "The Web drives an advertising boom without the need for agencies"; International Herald Tribune (iht.com); Feb. 8, 2007.
"This Ad's for You—Just You"; BusinessWeek online; Jun. 28, 2005.
"TiVo Launches New Interactive Advertising Technology"; press release from www.tivo.com; Jul. 18, 2005.
"TiVo Announces First Advertising Search Product for Television"; press release from www.tivo.com; Nov. 28, 2005.
"TiVo Begins Rollout of Online Services Now Accesible Directly on the TV"; press release from www.tivo.com; Dec. 1, 2005.
"TiVo Launches Television's New Advertising Search Product"; press release from www.tivo.com; May 8, 2006.
"Venture Market Summary"; VentureWire Alert; Mar. 29, 2005.
"Visible World Targets Advertising Industry"; from http://informitv.com; Feb. 20, 2005.

\* cited by examiner

TARGETED TELEVISION ADVERTISING BASED ON A PROFILE LINKED TO AN ONLINE DEVICE ASSOCIATED WITH A CONTENT-SELECTING DEVICE

CROSS-REFERENCE TO RELATED APPLICATIONS

This application is a continuation of application Ser. No. 13/906,211, filed May 30, 2013, now U.S. Pat. No. 9,071,886, which claims the benefit of provisional application Ser. No. 61/655,951 filed Jun. 5, 2012, which provisional application is hereby incorporated by reference as if fully set forth herein.

BACKGROUND

The field of the present invention relates to correlating or targeting actions or activities pertaining to multiple associated devices, including two or more online devices (such as desktop computers, portable computers, game consoles, mobile phones or smartphones; referred to herein as ODs) and possibly including a set-top box (referred to herein as a STB).

It is common for a single household to have multiple users that consume media content or access online content. It is conventional to collect profile information for each user. The items of profile information can arise from online sources or offline sources, and each item may or may not include or be linked to personally identifiable information (PII) for the user. Typically those items of profile information that are not associated with PII would be collected in a separate profile that would not be recognized as belonging to a specific, identified user, but instead would be linked to a device identifier. It is conventional to select targeted advertising based on user profile information and to present that targeted advertising during presentation of media content. In a multiple-user household, there is often a choice to be made among different advertisements targeted based on different user profiles. Choosing the most appropriate advertisement to present at a given time can be problematic, e.g., an advertisement selected based on profile information of a first user might be presented while media content is consumed by a second user.

It is therefore desirable to solve the technical problem of using a suitable user profile, among multiple user profiles associated with a single household or location, to select a targeted advertisement for presentation during or within specific presented media content.

DESCRIPTION

To solve the stated technical problem, methods are disclosed whereby advertising delivered during or along with specific media content can be targeted based on user profile information arising from multiple online devices. Which profile is used is determined in part on the manner in which the media content is presented for viewing. A method is performed by a profile provider (PP) entity using a computer system connected to the Internet and comprising one or more servers, and can be summarized as follows. First, multiple devices, including at least two online devices (ODs) and possibly including a set-top box (STB), are associated with one another in any suitable way. A location of one of the online devices of the set (referred to as the primary online device, or OD1) at some point in time (e.g., before, contemporaneous with, or after establishing the association with another one of the devices) is estimated to be a shared location of the set of associated devices, and that location is used as a proxy for the location of the set in later steps. One or more secondary online devices (OD2s) are observed to be located "near" the proxy location of the set and as a result are associated with the set. Second, media content is selected or received using one of the associated devices of the set and presented using one of multiple different displays (e.g., on the selecting device's own screen, transmitted directly from the receiving device to an external monitor or flatscreen, or transmitted from the receiving device over a wired or wireless LAN or other connection to an external monitor, a flatscreen, or one of the other associated devices). Third, an advertisement is presented during presentation of the media content. The advertisement is selected based on an online profile of OD1 or an OD2. Which profile is used is determined at least in part by which display is employed at the time the advertisement is presented, and can also be determined in part by which one or more of the OD1 and OD2s are near (or inferred to be near) the proxy location of the set of associated devices at the time the advertisement is presented. In the following sections, each of those activities will be described in further detail, including variations and alternatives.

Associating a Primary Online Device (OD1) with a Set-Top Box (STB)

A primary online device (OD1) can be directly associated (in any suitable way) with a set-top box (STB). "Directly" merely indicates that the association between the STB and OD1 can be established explicitly. Various suitable ways for establishing or recognizing such an explicit association are disclosed in the patents and pending applications cited above. In some of those examples, a TVCP/ISP (i.e., a television content provider and Internet service provider) can provide both online access and television service to a given subscriber, typically at a known, single location (e.g., a residence or business). An online device provided with online access (by the TVCP/ISP) at that service location can be associated with the STB as OD1. In other examples, a subscriber's OD1 and STB can be associated based on both devices being connected to a common LAN (local area network; wired or wireless, using any suitable network architecture or protocol). That common connection can be detected in a variety of ways, e.g., by detecting that Internet traffic is routed to both OD1 and the STB via a common IP address or portion thereof, or by detecting that both OD1 and the STB are connected to the same router.

In other examples, a TVCP can send an email to a subscriber that includes electronic indicia that identify the subscriber or the subscriber's STB; such identification can employ a pseudonym representing any of the data. The indicia could be incorporated, for example, as a 1×1 pixel redirect in an HTML email, or in any other suitable manner. When the subscriber opens the TVCP email, the online device used to open the email is redirected to a TVCP server or TVCP computer system along with the STB identifier or a subscriber identifier (or pseudonym). Instead or in addition, the TVCP server or computer system can gain access to a subscriber's online device and to his or her log-in data when the subscriber logs in to a TVCP web site or application (e.g., a software application that enables a mobile device or tablet to act as a remote control for the STB), or when the subscriber logs in to a third-party web site or application that directs or redirects the online device to the TVCP server along with the subscriber's PII. The online device used by the subscriber to open the email or log-in (referred to hereafter as the initiating online device) may or may not be associated as OD1 with the subscriber's STB, as further described below. The TVCP server or computer system access to the initiating online device following the redirect or log-in enables the TVCP system to associate the initiating online device with the STB, if it chooses to do so, using the PII provided by the initiating online device to pull the subscriber's STB identifier or by using the STB identifier pseudonym provided by the initiating online device. The TVCP system can associate an online device identifier of the initiating online device with the subscriber's STB identifier or STB pseudonym.

In another example, a TVCP presents a personalized barcode on the TV screen. The barcode is personalized in that it encodes instructions to redirect a mobile device with a camera that takes a picture of the barcode on the TV screen to an online server along with indicia identifying the subscriber's STB. The mobile device can be redirected to a profile provider (PP) server, or to a TVCP or other server that in turn redirects to the PP server (directly or via one or more intermediary servers). The PP can then associate the STB identifier or pseudonym with an identifier of the mobile device. Additional information pertaining to the subscriber or the STB can be encoded into the personalized barcode, e.g., the geographic location of the STB. In one example a barcode, such as a two-dimensional QR ("quick response") code, is presented on a television screen, and a user is asked to photograph the barcode with his or her smartphone (for example to visit a television program web site). Barcode reader software on the smartphone decodes the barcode, which encodes a uniform resource locator (URL) usable by the smartphone's browser software. That URL indicates an online site and also includes an identifier or pseudonym for the television subscriber's STB. When the smartphone visits the online site indicated by the encoded URL, the online site server can retrieve the STB identifier or pseudonym and include it in a redirect to a PP server. The PP places, modifies, or recognizes its own cookie or other identifier on the user's smartphone to include or reference the user's STB identifier or pseudonym, thereby establishing an electronic association between the smartphone (the initiating online device) and the STB. In this example, different personalized barcodes can be sent to different television service subscribers identifying their respective STBs.

To function as primary online device OD1 associated with a STB, an initiating online device must be (i) a stationary online device (e.g., a desktop computer or workstation) that resides at the STB location, or (ii) a mobile online device (e.g., a laptop computer, tablet, or smartphone) that is at least transiently located at the STB location. Determining whether a given initiating online device can properly function as a primary online device OD1 is described below. The TVCP typically knows the location of the subscriber's STB and can employ or provide all or part of that information to perform or facilitate subsequent steps.

In the latter examples disclosed above (e.g., wherein a TVCP email, a TVCP site or application login, or a barcode is employed), the TVCP typically conveys to a profile-provider entity (PP), or causes to be conveyed to the PP, information pertaining to the initiating online device and the subscriber's STB. Examples of such PP entities are given below. In some of the examples disclosed above, the initiating online device is redirected to a PP server or computer system (directly or via one or more intermediary servers), e.g., from a server hosting the TVCP site or communicating with a software application, following a URL redirect from the TVCP email to a TVCP server or other server that in turn redirects to a PP server, or following a barcode-initiated visit to a TVCP server or other server that in turn redirects to a PP server. Such URL redirection typically includes a URL address (or other data-passing technique) that passes electronic indicia of the subscriber's STB identifier or pseudonym, and optionally additional information pertaining to the subscriber. In some examples, to allay privacy concerns, the PP server or computer system can be co-located with servers or computer systems of the TVCP so that redirection of a subscriber's online device does not result in direct contact between that online device and a server or computer remote from the TVCP; such a co-located PP server or computer system can nevertheless place, read, or amend a cookie on the subscriber's online device that was placed or is readable by other, remote PP servers or computer systems.

Alternatively, in the email or barcode examples, the initiating online device can be directed or redirected (directly or via one or more intermediary servers) to a PP server or computer system (remote from or co-located with the TVCP) without also making contact with a TVCP server or computer system, e.g., if the email redirect or barcode includes instructions for the online device to make contact with the PP server and to convey indicia of the subscriber's STB identifier to that PP server. In that sort of example, after the TVCP transmits to the subscriber the email or barcode, subsequent association of the subscriber's STB identifier or pseudonym with an identifier of the initiating online device can be established without further involvement of the TVCP. As a result of any of the different redirections described above, the PP server can place, modify, or recognize a cookie on the initiating online device; that cookie can act as an online device identifier. The PP can store the received information, including indicia of the STB identifier or pseudonym, within the cookie or in a central database using the cookie as a record locator.

In addition or instead, the TVCP can place, modify, or recognize its own cookie on the initiating online device and maintain a log or database of cookies or other initiating online device identifiers (such as an online device fingerprint) and associated STB identifiers for a multitude of subscribers. Such a log or database can be transmitted directly to a PP periodically, intermittently, or on an ongoing basis. The PP can use the received log to update its own database or in any other suitable fashion. In one example, the PP uses received device fingerprints (i) to recognize an initiating online device if and when it later encounters that online device or (ii) to retrieve location or profile information previously collected for a given online device. In another example, the PP and TVCP use cookie syncing to sync their cookies; when the PP receives a TVCP log file it can use the TVCP cookie IDs to find the associated PP cookies IDs and associate the STB indicia with the relevant PP cookie ID in the PP database and perhaps also store the STB indicia in the PP cookie. In one example of cookie syncing, a TVCP redirects subscribers' online devices to a PP server along with the corresponding TVCP cookie identifiers. The PP server associates the TVCP cookie identifiers with the corresponding PP cookie identifiers. The TVCP can then provide the PP with a file containing TVCP cookie identifiers and associated profile information (such as the STB indicia or geo location); the PP can use the TVCP cookie identifiers to determine to which PP cookie identifiers to add the received profile information (in a central database or in the cookie, as desired).

However the information is conveyed to the PP, that information enables the PP to associate online profile information pertaining to online activity conducted via the initiating online device with the subscriber's STB identifier, as is conventional.

Estimating that the Initiating or Primary Online Device is "Near" the STB

In the course of online activity conducted via an online device, that online device may occasionally make electronic contact with a PP server. During each such contact, the PP server can estimate the location of that online device and cause that location information to be stored (e.g., in a log, history, or database, or in a cookie on the initiating online device). At the time the PP computer system receives electronic indicia of an initiating online device identifier and the subscriber's STB identifier, a PP server can (i) estimate whether the initiating online device was "near" the subscriber's STB at some time in the past (e.g., if the PP has any past location data for the initiating online device), (ii) estimate whether the initiating online device is currently "near" the subscriber's STB (e.g., if the PP has received the electronic indicia via a redirect of the initiating online device). Alternatively, the PP server can (iii) monitor the initiating online device's location, even if not continuously, and "notice" (estimate) later whether it goes "near" the subscriber's STB (e.g., by checking its location when electronic contact is later made between the initiating online device and the PP's server).

"Near" can be defined in a variety of ways, and the estimate can be made in a variety of ways. The reliability of the estimate (i.e., the probability that an improper association will be established between an OD1 and a subscriber's STB) can vary substantially depending on how "near" is defined and estimated. In the barcode example described above, the smartphone that captures an image of the barcode on the television screen can be assumed to be at the location of the STB when the image is captured, and therefore can be correctly presumed to function as OD1.

In a first example, information conveyed by the TVCP to the PP (by example via direct transmission or redirect) indicates the location of the subscriber's STB. Privacy restrictions may limit the precision of such information (e.g., limited to city, zip code, neighborhood, or street); if permitted, complete address or precise geographic coordinates can be provided. Upon encountering the initiating online device, the PP can estimate its location and compare it with the STB location. The PP can estimate the location of the initiating online device by using, for example, reverse IP address lookup (e.g., in a database that includes IP addresses and geographic locations; the precision of such databases can vary from metropolitan area to exact street address, or any intermediate level of precision), device GPS coordinates or coordinate ranges, or relative signal strengths of nearby WiFi transmitters or cell towers detected by the device. Depending on the precision of the available location data (typically, but not always, more precise for the online device location than for the STB location), a suitable criterion (using one or a set of several factors) can be established for estimating whether the initiating online device and the subscriber's STB are "near" one another. The criterion can be selected to result in a desired level of confidence that the association between OD1 and the subscriber's STB has been accurately established. If the criterion is satisfied and the initiating online device is regarded as the primary online device OD1, then its location when it is "near" the subscriber's STB can be used as the proxy STB location in subsequent operations.

In another example, an online device and STB can be automatically estimated to be "near" each other without checking any location or distance criterion or threshold. For example, if a software application on the initiating online device is used to control the STB, then the initiating online device can be automatically assumed to be "near" the STB without checking any location or distance criterion. In another example, if the initiating online device is used to open an email from a TVCP late at night, and if the associated STB is known to be a residential STB (e.g., because the TVCP provides to the PP information pertaining to only residential STBs), it might be automatically assumed, without any location information for the STB or online device, that the initiating online device is "near" the STB (based on the presumption that late at night the subscriber is at his or her residence). In another example, if the STB is known to be residential (e.g., because the TVCP provides to the PP information pertaining to only residential STBs), and if the PP identifies an initiating online device location as a residential location (e.g., because a reverse look-up of the initiating online device IP address from a third-party database identifies the IP address as being a residential IP address), then the PP might automatically assume that the initiating online device is at the STB residential location, without any location information for the STB or online device. In a variation, the PP can confirm the initiating online device location as the subscriber's STB residential location, or cancel its previous identification of the STB residential location, based on how many times it encounters the initiating online device at that location over a certain period of time (e.g., to reduce the likelihood of erroneously associating the subscriber's online device with a friend's residential STB upon detection of the subscriber's online device at the friend's residential IP address).

In another example, in instances where it is known that a STB is located at a residential location (whether or not the actual address of the residence is known) but there is no database identifying whether an IP address is assigned to a business or a residence, an initiating online device might be observed to be used at two different IP addresses, and it might be presumed that one of the IP addresses likely corresponds to the subscriber's workplace and the other to the subscriber's residence. The workplace and residence locations can be distinguished based on the number of online devices connected to a common LAN at those locations. For instance, in an IPv4 architecture, if one of the IP addresses is shared by ten different online devices and the other IP address is shared by only three different online devices, then it is likely that the first IP address is the workplace address and the second IP address is the home address because it is reasonable to presume that there are more online devices at a workplace than at a home. Similarly, in some instances in an IPv6 architecture, if the prefix of one IP address is identical to the prefix of IP addresses of nine other online devices, and if the prefix of the other IP address is identical to the prefix of IP addresses of only two other online devices, then it is likely that the first IP address corresponds to a workplace and the second IP address corresponds to a home. More generally, the number of other online devices connected to a common LAN with a given online device can indicate whether that online device is located at a residence or at a workplace.

In yet another example, if the television subscriber receives both television service and online access service from the same provider (TVCP/ISP), the PP can determine the ownership of the IP address used by the initiating online device to determine whether the initiating online device is at the STB location (where the subscriber receives the television service). Such an example assumes the television subscriber receives online access service at home from a provider that is different from the provider of online access to the subscriber at the workplace or at other locations (such as coffee shops or friends' houses); otherwise the subscriber's STB might be erroneously estimated to be located at the workplace. The likelihood of such a mistake can be reduced by also considering the time of day and day of the week when the initiating online device communicates with the PP. If a weekend, regardless of the time of the day, the subscriber is likely at home if the IP address is owned by the subscriber's TVCP/ISP. If a weekday (Monday to Friday) and during working hours, then the subscriber is likely at the workplace; if during the work-week and early morning, evening, or late at night, then the subscriber is likely at home. Time of day could be used independently as well (regardless of the ISP identity). If it is late in the evening, the PP might assume with high probability that the initiating online device is at home.

More generally, one exemplary solution for reducing errors in the identification of an initiating online device location as a STB location is to check the number of online user interface devices sharing a common IP address for online access at a given location (i.e., sharing the same LAN). If the number is over ten, for example, then it is more likely that the initiating online device is being used at a workplace or a public location such as a coffee shop or an airport, and it is less likely that it is being used at home (regardless of the time of day). Under such circumstances, that location should not be estimated to be the STB location or used as such in subsequent steps.

In yet another example, the PP can receive the STB geographic location from a third party that has a database of television subscribers and their TVCPs. In one alternative, such a third party that has a television subscriber's personally identifiable information (PII) can redirect the subscriber's online device, e.g., after the subscriber logs in to a server of the third party, to a server or computer system controlled by the PP; that redirect can convey the geographic location of the subscriber's STB (with or without PII, as needed or desired). In another alternative the PP can receive the home or business address of an initiating online device from a third-party data provider that can redirect the initiating online device to a PP server along with the home or business address (exact home address if permitted, or less accurate address information such as a zip code if required by privacy policy or regulation). Such a redirect will likely not include PII (other than the address information).

In another example, if the PP learns that the STB is used in a residence (explicitly because informed by the TVCP, or implicitly because the TVCP only redirects residential subscribers' online devices), the PP can assume that the subscriber's residential address (obtained from a third party) is the location of the subscriber's STB. In another alternative, when a PP server communicates with the initiating online device, it can reverse look-up the device IP address to find its geographic location.

Regardless of the way the PP gains access to the geographic location of the online device and the geographic location of the STB, it can compare their locations. If they match, or are in close enough proximity, then the initiating online device can be estimated to be at the STB location.

In various examples (including some of those described above), information conveyed by the TVCP to the PP (for example via direct transmission or redirect) indicates either a residential or commercial location for the subscriber's STB. Over time, an initiating online device that is mobile is observed at differing locations. Whether those locations are commercial or residential might be inferred based on time of day (e.g., daytime locations assumed to be commercial and evening/nighttime/early daytime locations assumed to be residential) or on the type of IP address (e.g., static IP addresses assumed to be commercial and dynamic IP addresses assumed to be residential). The initiating online device is assumed to be properly regarded as a primary online device OD1, and the proxy STB location can be the OD1 location estimated when OD1 is encountered at a time of day or from an IP address that is consistent with the type of subscriber STB location. In various cases (including some of those described above), a TVCP may only provide the PP with information about residential STBs. Without receiving from the TVCP information about the location or type of location of a specific STB (and perhaps only receiving indicia of the specific STB identifier), the PP can nevertheless in some instances recognize when OD1 is located at a residential location (and hence at the STB location) using the described methods (for example, time of day, or location type).

Note that there can be instances when the initiating online device is never detected "near" the subscriber's STB. That situation can arise, for example, if the initiating online device is a stationary device that resides at a location remote from the subscriber's STB, or if the initiating online device is a mobile device that is never located (or noticed to be located) "near" the subscriber's STB. Typically, an initiating online device that is never "near" the subscriber's STB will not be regarded as a primary online device OD1, its location will not be used as the proxy STB location, and subsequent steps will not be performed based on the location of that initiating online device.

In some instances, however, a so-called "two-step" association can be established based on an initiating online device that is never "near" the subscriber's STB. If a mobile online device is observed to be transiently "near" the initiating online device at various times (or if both of the mobile online device and initiating online device are used to log in to the same web site or application using the same credentials), and observed to be transiently "near" the subscriber's STB at other times, that mobile online device can function as a primary online device OD1, and its location (when observed "near" the STB) can be used as the proxy STB location. An OD1 identified using such a two-step association with a STB may be less desirable than the more direct associations described above, due to a higher probability of error in establishing the association.

Observing Secondary Online Device(s) (OD2s) "Near" the STB Proxy Location

Over time, one or more secondary online devices (OD2s) are observed to be located "near" the STB proxy location (i.e., the location of OD1 at the time it was estimated to be "near" the subscriber's STB). As a result, one or more OD2s are indirectly associated with the subscriber's STB. "Indirectly" merely indicates that the association between the STB and OD2s is established using a STB proxy location that was determined using OD1, as described further below.

This disclosure offers significant advantages over known conventional techniques because, e.g., in cases wherein the subscriber's STB is not connected to a computer network and the TVCP does not provide online access to the subscriber, the STB proxy location established by OD1 may be the only way to establish any connection between the OD2s and the subscriber's STB; in known conventional techniques no connection between OD2s and the STB could be made. That is advantageous, as it enables, for example, the delivery of targeted television ads to the STB based on the online profiles of online devices used by other household members (OD2s), in addition to targeted television ads based on the online profile of the household member that uses OD1.

One or more of the online devices (OD1 or OD2s) can be mobile, so that their locations can vary with time. An association between an OD2 and the STB can be established based on OD2 being "near" the STB proxy location at a point in time before the OD1-STB association is established and the STB proxy location is estimated (e.g., looked up in a log, history or database, or recorded in a cookie on OD2), or at a point in time after the OD1-STB association was established and the STB proxy location was estimated (e.g., as a result of subsequent contact with a PP server).

In one example, OD2 being located "near" the STB proxy location can be estimated by OD1 and OD2 sharing a common LAN (at least transiently). In one case of this example, OD1 is estimated to be "near" an associated residential STB (in any of the ways described above), and the IP address (or part of the IP address, such as an IP address prefix) used by OD1 at the time of the estimate is used as a proxy for the STB location. Other online devices (OD2s) for which Internet traffic is routed via an identical or partially identical IP address are estimated to be connected to the same LAN as OD1, to be at the same location (because they are connected to the LAN), and to be at the same location as the STB. The OD2s thus identified are associated with the STB. The estimation that an OD2 is at or near the STB location need not occur while OD1 is at or near the STB location. In another example, GPS coordinates of OD2 can be compared to the OD1 location when OD1 was estimated to be "near" the STB. If the OD2 GPS coordinates are close enough (based on any suitable criteria), then the OD2 is associated with the STB. Again, the estimation that an OD2 is close enough to the STB location need not occur while OD1 is near the STB location.

In some examples, an association between a STB and an online device OD2 can be undone by a PP server under certain circumstances. If the PP recognizes that an OD2, that was associated with the STB due to the sharing of a common LAN with an OD1 associated with the STB, does not again share a common LAN with OD1 for more than a week (or other suitable period of time), then it can be inferred that the STB-OD2 association was not correct (e.g., perhaps OD2 belonged to an infrequent visitor to the STB location).

Another way in which a set of multiple online devices can be associated with a set-top box (and therefore with one another) can be based on each of those online devices receiving media content and transmitting it for presentation via the set-top box. Assuming the set-top box is provided with online access (in any suitable way), it can report to a TVCP server, a profile provider server, or other server an identifier for each online device from which it receives media content. Those identifiers can be associated with one another on the basis of being received from the same set-top box; subsequent steps can be performed based on the device associations thus established.

Associating Online Devices without a Set-Top Box

Two or more online devices (ODs) can be associated in any suitable way without any of the online devices necessarily being associated with a set-top box. Various examples of establishing or recognizing an association between different online devices can include, but are not limited to: (i) detecting or recognizing that multiple online devices are connected to a common local area network (LAN), e.g., by detecting that Internet traffic is routed to the online devices via a common IP address or portion thereof, or by detecting that the online devices are connected to the same router; (ii) detecting or recognizing that multiple online devices are used to log in for online access or to the same online site using the same authentication credentials (e.g., user name and password); (iii) detecting or recognizing that multiple online devices are each redirected from corresponding emails sent to the same email address; or (iv) detecting or recognizing that multiple devices receive online access from the same ISP under the same subscriber account.

In other examples, online devices that are not necessarily associated with a STB can nevertheless be associated with one another based on estimates of "nearness" to one another similar to any of those described above for estimating nearness of OD1 and the STB or nearness of OD2 to the STB proxy location, e.g., based on connection to a common LAN, reverse IP lookup, sufficiently close GPS coordinates, relative signal strength from nearby WiFi transmitters or cell towers, time of day, residence versus commercial IP address, number of devices present at the location, information from third-party data providers, and so on. Thus a proxy location for the set of associated online devices can be estimated in a manner analogous for estimating a proxy STB location described above. In either case (with or without an associated STB), the result is a proxy location for a set of associated devices, which proxy location can be used to enable subsequent steps.

Receiving and Presenting Media Content

Media content can be selected, received, or presented using any one of the multiple devices associated with one another in any of the ways described above. The set of associated devices includes at least two online devices (ODs) and can also include a set-top box (STB). Media content can include, e.g., television, movie, or other video content, pictures or images, music or other audio, web pages, games, presentations, or multimedia content; as an example and without loss of generality, video content is mainly described in what follows. The received media content can be sent by ("pushed") or retrieved from ("pulled") any suitable source, e.g., from an online server, from a TVCP server, from network-attached storage (NAS) accessed via a LAN, WAN, or the Internet, or from a hard disk; NAS or a hard disk can be connected to or part of one of the associated online devices or set top box.

The media content can be selected, received, and presented using one or more of the associated devices. For purposes here, we shall refer to a "selecting device," and "receiving device," and a "presenting device." Any of those three devices can be an OD or a STB or can include an OD or a STB. In some examples, the selecting, receiving, and presenting devices are three different devices; in other examples, they are two devices; in still other examples, they are all the same device. For example, a presenting device can be integrated with a selecting or receiving device, or vice versa. One or more of the selecting, receiving, or presenting devices is among the set of associated online devices (associated in any fashion described above). In embodiments wherein the presenting device includes an OD or an STB, the presenting device can be formed with the display integrated with the OD or STB into a single unit or "box," or the presenting device can be composed of separate units or "boxes" in communication with each other; for example, a "presenting device" can be a television serving as a display in communication with a television content delivery unit (e.g., an Apple TV® unit) serving as an STB. In embodiments wherein the presenting device does not include an OD or an STB, the presenting device can be as simple as a monitor screen with little or no other functionality.

Whether or not the presenting device differs from the receiving device, the received media content can be presented in different ways. The received media content can be presented on a presenting device that is better suited for viewing by one viewer, such as a laptop with a small screen or a smartphone screen (often the dedicated or integrated display of the presenting device); in those examples, the receiving and presenting devices are often one and the same. Alternatively, the received media content can be presented on a presenting device that can be viewed readily by more than one viewer at one time, such as a large flatscreen device or a projector device. In general, presenting devices can present the media content using various displays (the display is part of the presenting device), which can be roughly divided into two categories: those better suited for multiple viewers and those better suited for a single viewer. Examples of displays better suited for multiple viewers include a television, a monitor, a flatscreen, or a projector. Displays better suited for a single viewer include displays wherein the media content is presented on a dedicated display of a portable device (which can be an associated online device); examples include a laptop computer, a tablet computer, or a smartphone.

In one example, media content is selected and received by a first, online device and presented on a second, multiple-viewer presenting device. Alternatively, a selecting device can instruct, direct, or otherwise cause a different receiving device to receive or retrieve the media content. The media content can be transmitted from the receiving device to the multiple-viewer presenting device via a wired or wireless connection.

Examples of a wired connection to the presenting device can include but are not limited to HDMI a/k/a high-definition multimedia interface, DVI a/k/a Digital Visual interface, VGA a/k/a video graphics array, or Super VGA. Examples of a wired or wireless connection wherein the media content is delivered to the presenting device over a wired or wireless network can include but are not limited to media delivery over a wired LAN (using Ethernet protocol, for example), over a wireless LAN (for example, using WiFi a/k/a IEEE 802.11, WiDi a/k/a WirelessHD, DLNA a/k/a Digital Living Network Alliance, or AirPlay®), or over a wireless personal area network a/k/a WPAN (for example, using UWB a/k/a Ultra Wide Band). The presenting device can include an appropriate adapter enabling the reception of media content over such various wired or wireless connections or networks.

Selection/Presentation of Advertisements Based on Viewing Mode and Profile Information Associated with an Online Device After multiple devices (including at least two ODs and perhaps including a STB) are associated with one another, targeted advertisements can be selected (by or at the direction of the PP) based at least in part on profile information associated with a given one of the ODs, e.g., (i) online behavioral profile information such as browsing history or search history of a user of the given OD, (ii) demographic information associated with a user of the given OD, (iii) offline profile information pertaining to a user of any of the associated ODs that can be acquired with the assistance of the TVCP (described further below), or (iv) offline profile information pertaining to a user of the given OD and acquired according to the teachings of, e.g., U.S. Pat. No. 7,890,609 referenced above. The advertisements thus selected can be directed for presentation along with the received media content.

Which type of display is employed can at least in part determine which profile is used to select a targeted advertisement to be presented along with the received media content. Recognition of a single-viewer display (such as a smartphone display or a laptop screen) can result in selection of a profile associated with the selecting device (used to select the media consumed by the device user), regardless of whether the selected media is consumed on the selecting device or a different presenting device); that profile can be used to select an advertisement to be delivered to the presenting device. Recognition of a multiple-viewer display can result in selection of a profile associated with the selecting or receiving device or a profile associated with the presenting device (for example, the multiple-viewer display or an online device connected to the multiple-viewer display). That selected profile can be used to select an advertisement to be delivered for presentation on the selecting, receiving, or presenting device.

If a single-viewer display is employed, e.g., if the video content is presented using a dedicated display of one of the associated online devices, then it can be reasonably inferred that the user of one of an associated, selecting online device is watching the media content. In that case, an advertisement typically would be selected based on profile information associated with the selecting online device, regardless of which device receives or presents the selected media content. That may be particularly advantageous if the presenting online device is a portable online device, e.g., a laptop computer, a tablet computer, or a smartphone.

If a multiple-viewer mode is employed, e.g., if the video content is presented using an external television, monitor, flatscreen, projector, or other multiple-viewer display, then the time and manner of the presentation of an advertisement can be determined in a variety of ways. In various disclosed exemplary methods, targeted advertisements can be selected or presented based on the likelihood that the user of one of the associated online devices (i.e., ODx, which may or may not be the online device used to select, receive, or present the media content) is viewing specific TV programs/channels or watching television at specific times/dates, based on one or both of (i) a correlation between the ODx user's profile information and specific programs/channels (as described in several of the cited references), or (ii) a presumption that ODx is near the set of associated online devices (e.g., near the STB proxy location or connected to a common LAN), and by inference that the ODx user is present and watching the television content, based on an estimate that ODx is near the proxy location at a given time/date (as described above) or based on a location history of ODx at specific times/dates (as described below).

In some disclosed exemplary methods, targeted advertisements are selected based on profile information associated with one or more of the associated ODs (which may or may not be the device used to select, receive, or present the media content). The advertisements thus selected can be transmitted in advance to the online device or STB for storage (e.g., in a DVR) and presented later, or can be transmitted in real time or "on demand" as needed. The selected ads can be presented within specific media content, such as within specific TV programs/channels or on specific times/dates, e.g., according to the teachings of U.S. Patent Pub. 2009/0300675, U.S. Patent Pub. 2009/0299843, or application Ser. No. 13/274, 242 referenced above. The television advertisements can be selected/presented based on an expectation that the user of ODx is likely to be viewing those specific TV programs/channels at those dates/times (independently of whether ODx is presumed to be "near" the proxy location at those dates/times).

Based on the profile information associated with ODx (online or offline profile information), ads are selected (by or at the direction of the PP) to be directed to ODx, to another associated OD, or to an STB associated with ODx as described above; any of those devices may or may not be the device used to select, receive, or present the media content. When selecting ads, additional parameters can be taken into account such as which television program or channel or other media is being watched or likely watched, whether a single- or multiple-viewer display is used, or the likelihood that the ODx user is watching that TV program/channel or other media (e.g., based on correlation between the ODx user's profile information and the TV program/channel, as disclosed, e.g., in U.S. Patent Pub. 2009/0300675, U.S. Patent Pub. 2009/0299843, or application Ser. No. 13/274,242) referenced above.

In some other exemplary methods, the selected television advertisement is presented only when ODx is presumed to be "near" the proxy location. Only at a given point in time when one of the online devices is presumed (in any suitable way) to be located "near" the proxy location does the system trigger presentation of a targeted video advertisement for presentation with the media content, which targeted advertisement is selected based on profile information associated with that nearby online device. In other words, a presumption that ODx is "near" the proxy location at a given point in time is used to infer that the user of ODx is consuming media content at that time, and that an advertisement targeted at the user of ODx should be presented on the display where the media content is consumed. Whether the ODx is "near" the proxy location can be estimated in any of the various ways described above for establishing the association between the associated devices, or can be inferred based on a history or log of ODx being "near" the proxy location in the past (described further below). The advertisements can be selected and delivered to the device used to select, receive, or present the media content in any of the ways and at any of the times described above (e.g., selected and delivered ahead of time, selected or delivered in real time or on demand, or variations of those methods).

Advertisements can be selected based on the profile associated with a device used to select, receive, or present the media content or based on a profile associated with another online device associated with one of those devices. Regardless of how selected media is delivered to the presenting device, some or all of the selected ads can be presented on only the selecting device display, on only the receiving device display, on only the presenting device display, or on any combinations of those displays. In a specific example, a tablet computer is used to receive a movie and to stream that movie content to a flatscreen display. The streaming of the movie to a second display can be recognized and the second display can be determined to be a multi-viewer display (based merely on the streaming over a network to another display or to a device connected to another display, based on the second screen resolution, or based on other criteria). Based on that recognition, (i.e., that the movie is viewed on a multiple-viewer display) advertisements (in any format) can be selected based on profile information of a nearby online device, e.g., a smartphone. The advertisement thus selected is presented on the flatscreen along with the movie content. However, a different advertisement can be selected, based on profile information of the tablet computer or of another associated online device, and presented (simultaneously with the movie presentation on the multiple-viewer display) only on the tablet computer display. Which online device profile information is used to select advertisements presented via which device can be determined in any of the ways described above or below. It may be desirable in some instances to continue, for a period of time after video content is no longer being streamed to a nearby multiple-viewer display, to present advertisements via the selecting or receiving device, which advertisements are selected based on profile information of one or more nearby or associated online devices.

More generally, different advertisements can be selected and presented on the selecting device, the receiving device, or the presenting device. In one example, a first advertisement can be selected and presented on only a receiving online device's dedicated display; the first advertisement can be selected based on a profile of the receiving device or of another online device associated with the receiving device, in any suitable way described above. At the same time, if the receiving device is not also the presenting device, the receiving device can transmit the media content to a presenting device. A second advertisement can be selected and presented within the media content on the presenting device; the second advertisement can be selected based on a profile of the presenting device or of another online device associated with the receiving or presenting device, in any suitable way described above. If a multiple-viewer display device is employed (whether the receiving and presenting devices are the same device or different devices), another different advertisement can be selected and presented on only the presenting device; that advertisement can be selected based on a profile of the presenting device or of another online device associated with the receiving or presenting device. It may be desirable in some instances to continue, for a period of time after media content is no longer transmitted between devices or to a nearby multiple-viewer display, to present advertisements via the selecting device, the receiving device, or the presenting device that are selected based on profile information of the receiving device, transmitting device, or other associated device.

Regardless of the manner in which a television ad is selected or a program/channel or time/date is determined for delivering the selected ad, the ad can be delivered or presented in any suitable way. In some examples, the selected television advertisement (or an identifier thereof) is sent by the PP to the TVCP, along with an ODx or STB identifier or pseudonym (e.g., the STB identifier or pseudonym that was received from the TVCP as being associated with OD1, and later associated with OD2 estimated to be at the STB location) and an indicator of the program, channel, time, or date on or during which the ad is to be presented. The TVCP can use that information to arrange the presentation of the television advertisement on the STB at a suitable point in time. The PP can typically transmit the selected television advertisement, or an identifier thereof, to a CAS operated by the TVCP along with the subscriber's STB identifier. The profile information (online or offline) pertaining to ODx need not be conveyed to the TVCP. In some examples, the PP can associate observed online behavior on ODx with the selected targeted television advertisements delivered or presumed delivered on the STB associated with ODx, for online behavior that takes place on ODx after the expected or reported presentation of the selected targeted television advertisements on the STB (as disclosed, e.g., in U.S. Patent Pub. 2009/0172728 or application Ser. No. 12/906,007 referenced above).

In various examples, television advertisements can be selected based on profiles associated with one or more associated online devices, and then transmitted for storage on the STB or other receiving online device, on an ad server or other server, or on another device; the stored television advertisement is presented only at a suitable point in time according to electronic instructions. In some cases, the stored television advertisement is shown only when the correct channel is being watched or during the correct television program. In another case, only when one of those online devices is presumed to be "near" the proxy location (by the online device, STB, PP, TVCP, or a third party) is a corresponding stored television advertisement presented. In various cases, instructions stored in the STB cause the STB to present a stored ad when the STB detects a "nearby" ODx, or to present a stored ad when an ODx is inferred to be "near" the STB based on a location history of that ODx, or to present a stored ad following detection of a "nearby" ODx by the PP, TVCP, or a third party. In another case, a selected television advertisement can be presented according to instructions stored in or received by an ad server to present an ad stored in the ad server. Different television ads can be presented at different times depending on different ODs being presumed to be located near the proxy location at those different times.

Additional Features or Embodiments

In examples wherein the presence of an online device is inferred based on a history or log of that online device being "near" an associated proxy location, such a history or log can be analyzed to predict future times when the online device will be present at the proxy location (and therefore times when the user of the online device might be inferred to be present and watching television content). For example, if an online device is connected to the Internet via the same IP address every Tuesday evening after 7 PM for the past three weeks, it might be presumed that the online device will be connected to the Internet via that same IP address on the next Tuesday evening after 7 PM. If the online device (when accessing the Internet via that IP address) was associated with a specific proxy location for an associated STB or set of associated devices, then television advertisements targeted based on profile information associated with the online device can be transmitted for presentation on the following Tuesday evening after 7 PM. Such a technique for estimating future presence of an online device near a given proxy location can be employed for choosing a time for presenting a television advertisement targeted based on OD-associated profile information in the context of methods disclosed above, i.e., for presenting an OD-targeted advertisement via a multiple-viewer display at the OD-associated proxy location at a future time when that OD is predicted to be near that proxy location.

The particular temporal pattern described above (Tuesday evening after 7 PM) is only exemplary; any discerned temporal pattern of an online device estimated to be "near" an associated proxy location can be employed as a basis for predicting future nearness of the associated online device to the proxy location. The particular criterion for "nearness" described above (use of a particular IP address) also is only exemplary. Any suitable criterion for nearness, including those already described above for establishing associations between OD1 and the STB or between OD2 and the STB, can be employed as a basis for logging or recording an online device's history of being near an associated proxy location and for predicting future nearness of the associated online device to that proxy location. In a similar manner, predicting future nearness of an online device to its associated proxy location can be based on geographic coordinates, street address, or any other suitable indicator of the online device's past locations.

In many cases IP addresses used by online devices for online access are dynamic rather than static. This could create a problem when an IP address (or a portion thereof, such as the IP address prefix shared with the router of a LAN) is used as a proxy for a location of a STB or a set of associated devices. An online device in the previous example (an ODx, for example) can be estimated to be near an associated proxy location even if its IP address changes from one Tuesday evening to the next. If the same group of ODs (each recognized by a unique cookie, tag, or device fingerprint, for example) were detected connected to a common LAN every Tuesday evening after 7 PM, then those ODs could be presumed to be located at the same location every Tuesday evening after 7 PM even if the IP address via which they receive Internet traffic changes from day to day or week to week. If one of those temporary IP addresses had been estimated to be "near" a specific proxy location, or if an online device of the group connected to the LAN had been associated with a specific STB when that online device was connected to that LAN, then the entire group of ODs can be associated with the proxy location or STB. A LAN to which this group of ODs is connected in the future can be similarly inferred to represent the proxy location. A prediction that one of the ODs will be at that proxy location on a future Tuesday evening can be made despite any change of the IP address via which Internet traffic is received by the online device. Put another way, detection of a recognizable combination of multiple online devices connected to a common LAN can serve as a proxy for the associated proxy location. Further, any online device recognized as being connected to the same LAN as the other online devices of the group could also be associated with the same proxy location.

The sharing of a LAN by a group of devices (e.g., multiple online devices and/or a STB connected to a common LAN) can be recognized using different techniques. In one example, online devices sharing a LAN in an IPv4 architecture can be recognized by a web server communicating with the online devices as having the same IP address, i.e., the IP address of the modem connecting the LAN to the Internet. Based on that common IP address, the web server can infer that the online devices share a LAN. In another example, online devices sharing a LAN in an IPv6 architecture might be recognized by a web server communicating with the online devices as having a partial identical IP address (e.g., due to the online devices sharing a sub-net (the LAN), the prefixes of their IP addresses would be the same). Based on the sharing of part of an IP address, the web server can infer that the online devices share a LAN. In yet another example, online devices sharing a LAN (for example in an IPv6 architecture) can be recognized as such by a web server that has access to the online devices' IP addresses using the following method. The server can trace the route through the Internet from the server (the origin) to each online device (the destination), e.g., using a command such as "tracert" in a Windows® operating system. The server can recognize that the router, one "hop" before the route ends at each online device, is the same router for all of the online devices of a group. As a consequence, the server can infer that online devices receiving Internet traffic via that router are connected to a common LAN. (The server can recognize the router according to its IP address and optionally can determine whether the router's IP address is a residential or commercial IP address using a third party database.) More generally speaking, a LAN can serve as a proxy for a STB location. The LAN can be identified in different ways. Some of those ways include, but are not limited to: (a) the IP address of a modem connecting the LAN to the Internet in an IPv4 architecture, (b) the prefix of an IPv6 address of devices connected to the LAN or of the LAN's router, or (c) the IP address of the LAN's router.

Any suitable criterion can be employed for estimating a common location for multiple online devices. For example, if three or more of a group of five online devices are often detected connected to a common LAN (in any suitable way, including those described above), then later detecting three of those five online devices connected to a common LAN characterized by a different IP address (or portion thereof) within, e.g., two hours or other suitable time interval, might be a suitable criterion for estimating that the different IP address (or portion thereof) corresponds to the associated STB or proxy location. In some instances detecting at least two of the online devices connected to the same LAN might be sufficient, while in other instances detecting four or more online devices connected to the same LAN might be necessary for a reliable presumption of nearness of the online devices to their associated STB or proxy location.

Additional examples of ways to determine the location of OD2 that is "near" a STB include the recognition of the usage of a software application on OD2 to control the associated STB, the usage of OD2 to add a movie to an instant queue from which that movie is later pulled to be watched from the STB (within a pre-determined period of time), the taking of a photo of a personalized barcode on the TV screen connected to the STB using OD2 (for example for the purpose of receiving a phone call to the home phone to learn about a product advertised on the television or to be able to view the advertised product web site on the smartphone screen). Such methods can also be employed to estimate that an initiating online device is "near" the STB and can be accurately presumed to function as OD1.

In another example, a portable device location such as a mobile phone location can serve as an indication of the user location. For example, if a user's laptop (an OD2) is associated with the user's mobile phone (another OD2), the mobile phone user is at home with the mobile phone, and the laptop was left at work, then the home STB can be targeted with ads based on online activity on the laptop when the mobile phone is recognized to be at home, even if the laptop is not.

In another variation, an online device is considered to be "near" the STB or not "near" the STB if its location was recorded within a pre-determined time period prior to the targeting of an ad to the STB (for example 30 minutes) and that recorded location is determined to be "near" or not "near" the STB.

Although a PP could be an independent third party, in some cases it could be owned by a television provider or another entity involved in the sending of ads to STBs. The PP can work with a CAS operated by another entity in some situations. In other cases, a CAS could be owned or operated by a PP. Other combinations are also possible.

In another example, location information of the STB (in cases where the STB location is known to the TVCP) is not shared by the TVCP at all. The PP associates the initiating online device with different locations where it identifies the device ("location" defined in any of the various ways described above). For each such associated location, the PP further associates with the initiating online device other online devices identified by the PP as visiting that location. The time and date when each device was identified at a location can also be recorded. The PP selects different television ads targeted based on profile information associated with the different online devices associated with the different locations visited by the initiating online device. The PP provides the TVCP with the television ads targeting the different online devices along with indicators of their respective locations (and possibly the time and date they were identified at that location). The TVCP, which has access to STB location information, but does not share the information, can then compare the different locations with the STB location and deliver to the STB ads selected based on OD2 profiles for only those online devices that were detected at the STB location.

Profile information associated with a given OD and used for selecting television advertisements targeted to a user of OD can originate from a variety of sources. For example, the PP can collect demographic or behavioral profile information based on online activity of the user of OD, e.g., as disclosed by U.S. Pat. No. 6,925,440, U.S. Pat. No. 7,428,493, or U.S. Patent Pub. 2008/0313194 referenced above. In another example, the PP can obtain offline profile data pertaining to a user of OD that is a subscriber of an ISP that provides online access to the user of OD, e.g., as disclosed by U.S. Pat. Pat. 7,890,609 referenced above. In another example, the PP can obtain offline profile data pertaining to a user of OD1 (i.e., the television subscriber of the TVCP). That offline data can be obtained from the TVCP or from a third-party provider of such offline data (typically facilitated by the TVCP). The offline data typically is added to a profile for the user of OD1. However, providers of such offline profile information (e.g., credit reporting bureaus or direct-mail marketing companies) typically link much of the information by household. For example, such offline data for a husband and wife residing at the same address typically would be linked to one another. Therefore, it can be desirable for the PP also to link, to the profile associated with OD2, offline data obtained for the user of OD1. If the users of OD1 and OD2 are members of the same household, then a significant portion of the offline data obtained for the OD1 user will be pertinent to the OD2 user. The offline data associated with OD1 (facilitated by the TVCP), can be associated with OD2 even if OD2 is "near" the STB location only transiently. The offline data thus associated with OD2 can be used to select television ads to be delivered to OD2 user on the associated STB; in addition, that offline data can also be used to select online ads to be delivered on OD2.

The TVCP can transmit offline profile information, or facilitate transmission from a third-party provider of such information, to the PP in any suitable way. For example, in several of the methods employed by the TVCP to associate a primary online device OD1 with a STB (e.g., wherein a TVCP email, a TVCP site or application log in, or a personalized barcode is employed), the TVCP can transmit to the PP offline profile data pertinent to the television subscriber (i.e., the user of OD1). The offline data can comprise information collected by the TVCP itself, or can include information collected by the TVCP from third-party providers. The offline data can be transmitted in any suitable manner, including those described above for conveying to the PP the STB identifier or pseudonym. The STB identifier or pseudonym and the offline data can be transmitted by the TVCP to the PP together, or the offline data can be transmitted later and labeled with the STB identifier or pseudonym, to enable the PP to link the offline data to the STB and to any OD1 or OD2s associated with the STB. In another example, the TVCP can transmit to a third-party offline data provider the television subscriber name (which is also the OD1 user name) and the corresponding STB identifier or pseudonym (which identifier or pseudonym is also transmitted to the PP to associate STB and OD1). The third-party data provider can in turn retrieve the pertinent offline data and transmit it to the PP along with the STB identifier or pseudonym, thereby enabling the PP to link the transmitted offline data to the OD1 profile, and also to any associated OD2 profiles, if desired. Use of a STB pseudonym may be preferred in this example, to limit the number of entities that become aware of the actual STB identifier used by the TVCP. To address subscriber privacy concerns in any of the foregoing examples, it may be desirable that no PII (or only limited PII) be included in the offline data transmitted to the PP.

In may be desirable, required, or necessary to maintain segregation of a subscriber's PII and online behavioral information. In the methods described above, the PP need not convey to the TVCP any of the online profile information pertaining to online activity conducted via OD1 or any OD2. Conversely, the TVCP (or third-party offline data provider) need not convey to the PP the subscriber's PII, except possibly location information for the subscriber's STB. That location information can be made as precise or imprecise as needed or desired to maintain a desired balance between maintaining subscriber privacy and establishing STB/OD1/OD2 associations with a necessary or desired level of accuracy.

None of disclosed methods necessarily require the subscriber's PII to be transmitted to the PP; neither is such merging of PII and online profile information necessarily precluded. The merging of PII with online behavioral profile information would require asking consumers to opt-in and agree to the merger of the data. Segregation of PII from online behavior information can be opt-out-based and does not require asking consumers to agree; they can opt-out if they so choose. Because opt-out-based solutions enable large scale deployments whereas opt-in-based solutions usually lead to limited-scale deployments, it may be desirable in many instances to implement the methods described herein in an opt-out fashion, maintaining segregation of the subscriber's PII from his or her online behavioral profile information.

One or more servers of the PP computer system can be programmed and connected to record in a log, history, tag or database time, date, and location data for each electronic contact with a multitude of online devices. Location data can include device GPS coordinates, identifiers of surrounding WiFi networks or cells towers and their relative signal strengths as recorded by the device, IP address, LAN proxies (e.g., the IP address of the modem connecting the LAN to the Internet, or the IP address or IP address prefix of the LAN's router), physical address, or other data that directly or indirectly can enable the computer system to determine, estimate, or infer the location of the online device. One or more PP servers can be further programmed and connected to receive data pertaining to an initiating online device used by a TVCP subscriber and that subscriber's STB identifier and to store such data in a log, history, tag, or database. One or more PP servers can be further programmed and connected to search, on a batch, on-demand, or ongoing basis such logs, histories, or databases to seek online device locations that might be "near" an STB location or "near" another online device location. Various steps of the methods described above can be performed in response to finding such pairs of nearby device locations. Various steps of the methods described above can be performed in response to collection of a new piece of data (e.g., upon encountering of an online device, whether following a URL redirection from a TVCP server or another PP server, at a certain time of the day, or from a specific location or type of location, and so on).

In any of the examples including delivery of targeted online ads or targeted television ads, the ads can be provided by a wide variety of sources or entities, and revenues can be generated and distributed in a wide variety of ways. Examples are disclosed in one or more of the applications cited above. In various examples, a PP can be compensated for enabling targeting of a television advertisement (based on online profile information) as well as targeting an online advertisement (based on actual or presumed viewing of the television ad). In another example, a PP could be compensated for providing information that is used in measuring the effectiveness of television advertisements.

For example, if following the presumed viewing of a Nissan Murano (an SUV) TV ad on a STB, an associated online user interface device is used to research the Nissan Murano on cars.com (a car review site), if cars.com redirects all visitor computers that read reviews of the Nissan Murano on cars.com to the CAS, then as a consequence of the redirect, the CAS can recognize the visit from the online interface device associated with the STB where the Nissan Murano television advertisement was presumed viewed. Such information can be very valuable for the advertiser. The advertiser or an advertiser representative (such as an ad agency), or an entity providing the advertiser with the service of measuring the effectiveness of the advertiser's TV ads as reflected by follow-up online behavior, could compensate cars.com for redirecting to the CAS those computers that visit cars.com's Nissan Murano review section.

In another example, a PP is compensated for the usage of offline data in targeting an OD2 with online ads or the usage of offline data in targeting an OD2 user on a STB associated with OD2 with television ads, where, in both cases, the offline data is received by the PP following the facilitation of the TVCP.

Systems or methods disclosed herein may be related to subject matter disclosed in:
- U.S. non-provisional application Ser. No. 09/593,993 filed Jun. 14, 2000 (now U.S. Pat. No. 6,925,440);
- U.S. non-provisional application Ser. No. 11/099,861 filed Apr. 6, 2005 (now U.S. Pat. No. 7,428,493);
- U.S. non-provisional application Ser. No. 11/736,544 filed Apr. 17, 2007 (now U.S. Pat. No. 7,861,260);
- U.S. non-provisional application Ser. No. 11/968,117 filed Dec. 31, 2007 (U.S. Patent Pub. 2009/0172728 A1);
- U.S. non-provisional application Ser. No. 12/131,798 filed Jun. 2, 2008 (U.S. Patent Pub. 2009/0300675 A1);
- U.S. non-provisional application Ser. No. 12/131,824 filed Jun. 2, 2008 (U.S. Patent Pub. 2009/0299843 A1);
- U.S. non-provisional application Ser. No. 12/186,918 filed Aug. 6, 2008 (U.S. Patent Pub. 2008/0313194 A1);
- U.S. non-provisional application Ser. No. 12/257,386 filed Oct. 23, 2008 (U.S. Patent Pub. 2009/0049468 A1);
- U.S. non-provisional application Ser. No. 12/688,731 filed Jan. 15, 2010 (now U.S. Pat. No. 7,890,609);
- U.S. non-provisional application Ser. No. 12/860,666 filed Aug. 20, 2010 (U.S. Patent Pub. 2010/0325659 A1);
- U.S. non-provisional application Ser. No. 12/906,007 filed Oct. 15, 2010 (U.S. Patent Pub. 2012/0096491 A1);
- U.S. non-provisional application Ser. No. 12/981,925 filed Dec. 30, 2010 (U.S. Patent Pub. 2011/0099576 A1); and
- U.S. provisional application Ser. No. 61/514,840 filed Aug. 3, 2011; and
- U.S. non-provisional application Ser. No. 13/274,242 filed Oct. 14, 2011 (U.S. Patent Pub. 2012/0096489 A1).

Each of the above-listed applications and publications is hereby incorporated by reference. Although the applications listed use similar terminology, there are some differences between terminology used in those applications and that used in the present disclosure. The definitions or descriptions set forth in the present disclosure shall apply herein if inconsistent.

Some of the terms used in the present disclosure are defined as follows.

Television content provider (TVCP)—an entity that provides television service or content to a subscriber or user via any suitable transmission medium or protocol. As is common in the art, in some contexts, reference to a TVCP may refer to the computer systems or other equipment controlled by the entity rather than the entity itself. Examples of a TVCP can include an entity that provides television service using physical infrastructure it owns, provides, or controls, e.g., a cable television provider or a satellite television provider. Other examples of a TVCP can include an entity that delivers content using physical infrastructure owned, provided, or controlled by another entity, e.g., online video streaming subscription services such as Netflix® or a television network broadcaster such as ABC, NBC, or CBS (whether broadcasting content over a cable television provider infrastructure or unicasting content via the Internet).

Internet service provider (ISP; equivalently, an online access provider)—an entity that provides online access to a subscriber or user via any suitable transmission medium, including but not limited to coaxial cable, fiber-optical cable, network cable, phone line, satellite transmission, wireless transmission (e.g., 3G, 4G, WiMax, WiFi, or other IEEE 802 wireless protocols), or VHF or UHF transmission. The online access enables the subscriber to access the Internet and its myriad online sites, or to access any future network successor to the Internet. As is common in the art, in some contexts, reference to an ISP may refer to the computer systems or other equipment controlled by the entity rather than the entity itself.

ISP/TVCP—in some instances a single entity (or providers controlled by a single entity) can provide to one or more subscribers or users both television service and online access. Such an entity is referred to herein as an ISP/TVCP. Although an ISP and a TVCP may be represented schematically in the drawings by separate labeled boxes, the drawings are intended to encompass instances in which the ISP and the TVCP are independent entities as well as other instances in which a common ISP/TVCP provides both services.

Set-top box (STB)—a device that connects a television and a signal source. As is recognized by those of skill in the art, a "television" is any device known in the art or developed hereafter that is capable of presenting television content to a viewer or user, e.g., a CRT or flat panel television set, a home theater system, a computer monitor, a tablet computing device, or a mobile phone or other handheld device. Some examples of STBs include cable boxes (often combined with personal video recorders), online-coupled gaming machines, appropriately configured computer systems that can drive a computer monitor, or modules of a mobile phone system allowing content presentation. The STB receives an incoming signal, extracts content from the received signal, and transmits the extracted content to the television to be presented to a viewer.

The signal source can be one or more of a computer network cable (e.g., an Ethernet or other transmission-speed cable), a satellite dish, a coaxial cable connected to a cable television system, a telephone line or digital subscriber line (DSL), a wireless network connection (e.g., via a cellular telephone network, WiFi, or other wireless connection), an antenna (VHF, UHF, digital, or other), or another suitable signal source. The content can include, but is not limited to, video (which often can include an audio portion), audio, Internet web pages, interactive games, or other content. An STB may or may not include a dedicated television tuner.

Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, a mobile phone, or a building equipment or junction box, which also has other functions, or without being housed in any "box" at all.

Online user interface device (equivalently, online device or OD)—any piece of computerized equipment used to access a remote network such as the Internet at least intermittently, including but not limited to a smart phone or mobile handset, a personal digital assistant (PDA), a game console, or a networked computer (desktop, workstation, notebook, laptop, or other).

Online access device—any piece of equipment used to connect an online user interface device to a remote network such as the Internet, including but not limited to a modem, a wired or wireless router, a wireless access point, a wired network adapter (e.g., Ethernet adapter), a wireless network adapter (e.g., WiFi, other IEEE 802.11, WiMax, ED-VO, EDGE, HSPA, CDMA, GSM, or other), or an optical fiber based network adapter (e.g., network interface unit or optical network terminal). Different types of online access devices can be and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem, or a mobile phone that can be used for online access).

Each online access device typically is identified on the Internet by an Internet Protocol address (i.e., an IP address; currently, under IPv4, an IP address comprises a sequence of four numbers each ranging from 0 to 255, i.e., a 32-bit address; under IPv6, an IP address comprises a 128-bit address; other, future-developed IP address protocols shall fall within the scope of the present disclosure or appended claims). Every transmission of data over the Internet includes a destination IP address to enable the transmitted data to reach its intended destination. In some instances an online access device has a static IP address, while in other, more common instances an online access device has an IP address that is dynamic and changes from time to time. Although IP addresses are referred to herein for enabling data transmitted via the Internet to reach its intended destination, that terminology is intended to encompass any functionally equivalent online access device identifier employed to route such transmitted data to its intended destination through the Internet or through any future successor network.

Device Identifier (e.g., online device identifier or set-top box identifier)—An online device or set-top box typically is indicated by one or more device identifiers. Such an identifier can be of any suitable type; examples can include: an IP address assigned according to any suitable IP address protocol; a tag or cookie placed or recognized on the device; an identifier assigned by a provider of service via the device or manufacturer of all or part of the device. Examples of the latter can include, e.g.: a STB identifier assigned by a TVCP; a modem or router identifier assigned by an ISP; a MAC address or serial number assigned by a device manufacturer; or a smartphone identifier such as a mobile phone number (MSISDN), service-subscriber key (IMSI or SIM identifier), Electronic Serial Number (ESN), Mobile Equipment Identifier (MEID), or International Mobile Equipment Identity (IMEI). The device identifier can in some instances be a pseudonym assigned to the device and used as a proxy for an actual device identifier. A device identifier can be stored locally on the device, can be stored remotely on a server of any interested party, or can be stored both locally and remotely. Different identifiers of the same device can be linked in a database, typically on a remote server, or in cookies or tags place on the device.

Device Fingerprint—An online device or a set-top box can in some instances be identified uniquely by a combination of parameters characterizing the device or software installed on the device. Such a parameter combination can be referred to as a device "fingerprint" and can be employed as a device identifier. Examples of parameters typically employed in a device fingerprint can include one or more of: an IP address, device configuration or hardware, device display type or resolution, operating system software, browser software, browser plug-in or add-on software, other installed software, user-selected font(s), user-selected language(s), time zone, or geographic location. Any operating system or software can be specified by program identity as well as by program version.

Router—any piece of equipment that acts as a junction between networks, to buffer and transfer data between or among them. For example, a router can be employed to connect a local area network (LAN) to the Internet, thereby enabling online user interface devices connected to the LAN to share a connection to the Internet through the router. The router receives data from devices on the LAN and transmits the data to the Internet, directed to the various destinations, and receives data from the Internet and directs the data to the corresponding devices on the LAN.

Modem—a piece of equipment that enables online access by a user by acting as an interface between the online access provider's network transmission system and the user's computer or other online user interface device. Modems vary according to the type of provider network transmission system. Unless a specific type of modem is specified, the term "modem" shall encompass telephone modems, cable modems, DSL modems, wireless modems, satellite modems, or modems for providing online access to any other suitable network transmission system.

User (equivalently, subscriber, viewer)—the term "user" shall be construed as what is thought to be an individual person receiving online access, television service, or media content at a delivery end-point, which is typically located within a household, office, business, or other site or establishment served by an online access provider or TVCP. A single household, office, business, or other location often has multiple users. In some instances, a business having multiple physical locations may be served by separate online or television services, but in other instances, a business may have an internal LAN or WAN that extends service provided to multiple physical locations. Also, some online user interface devices and televisions are portable and can access the service from remote locations. Accordingly, the term "user" does not require a fixed or single location in such instances. Reference to a "user" in some contexts actually refers to computer-controlled activity (monitoring, advertisement delivery, etc.) done in connection with a device (e.g., television, phone, laptop, or fixed-location computer) thought to be operated by the individual person called the "user." However, it is understood that a given device might be operated by multiple persons, such as different members of a household or business, at different times. Accordingly, as is common in the art, in some contexts, reference to a "user" may refer to the computer, device, or other equipment rather than the person.

Behavioral targeting—the delivery of specific advertisements to a user, the advertisements being selected on the basis of activity of the user, typically recent activity, including but not limited to: online or television-based searches conducted by the user; content viewed or otherwise accessed by the user online or on television; online or television advertisements viewed, clicked on, interacted with, or otherwise accessed by the user; shopping or purchases made by the user online or through a television; and any other form of previous user online or television activity.

Central Ad Server (CAS)—a computer server (equipment) that manages delivery of advertisements (television or online). A local ad server can be typically run by a single publisher to serve ads to visitors of one or more websites or viewers of television programs of that publisher, or by a single advertiser to serve ads into ad space acquired by the advertiser on various websites or television programs. A third-party or remote ad server typically is remotely located and delivers advertisements of various advertisers to visitors of websites or viewers of programs of multiple publishers. The remote ad server acts as a central conduit for delivering advertisements, enabling advertisers and publishers to track the distribution of their online or television advertisements and to control the rotation and distribution of their advertisements across the Internet or television system from one location. Either a local or a remote ad server can be considered a CAS. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include Double-Click's DART for Publishers central ad server (also known as DFP) and DoubleClick's DART for Advertisers central ad server (also known as DFA). In some cases, a CAS can be owned or used by a TVCP, an ISP, an STB provider or modem provider, an online content provider, a profile aggregator, a profile distributor, an ad broker, an ad network, an ad exchange, an ad agency, an online advertiser, a TV advertiser, a TV ad space owner, or a TV content provider, representatives or proxies of any of those entities, or other entities. In some instances that CAS will operate independently of an ISP or TVCP.

Profile provider (PP)—An entity that has or collects profile information that is used to target advertisements. In context here, the profile provider controls or cooperates with a CAS, which receives all or part of the profile information from the profile provider for use in targeting television or online advertisements. User profile information derived from online or television activity can include, for example, observed online behavior of a user accessing the Internet (e.g., online content viewed or accessed, online searches performed, online purchases made, or times and dates of such behavior), observed viewing or interaction behavior of a television viewer (e.g., television programs or ads viewed, responses to interactive programs or ads, or times and dates of such behavior), or demographic information collected from an Internet user or television viewer.

Examples of profile providers can include, but are not limited to, any entity that owns, controls, or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering content, images, audio, video, text, or any combination directed to a television via a STB (indirectly via a TVCP; or directly via an STB IP address, without necessarily being aware that the IP address in question corresponds to a STB); (4) a server delivering an ad to an online user interface device via an online access device on behalf of an advertiser or an ad network; (5) a server delivering a television ad to a television via a STB (indirectly via a TVCP; or directly via an STB IP address, without necessarily being aware that the IP address in question corresponds to a STB) on behalf of an advertiser or an ad network; (6) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; or (7) a server facilitating instant messages or any other kind of communication on behalf of the user.

Another example of a profile provider is: (8) a company sponsoring and having access to a software program located on the user's computer or other online user interface device that can observe the user's online activity (with the user's permission), such as a browser toolbar or desktop search software. A profile provider, broadly, can be: (9) any entity able to collect behavioral profiles (e.g., observed online activity) or demographic profiles (provided by the user), typically including a device identifier (e.g., an online user interface device identifier) used when profile information was observed or collected and the date and time that profile information was observed or collected, regardless of whether or not the entity collected the profile information directly through contact with the user's computer or indirectly from another entity such as those listed in this definition. In some cases, a user's online activity will result in direct contact between the online user interface device (via an online access device) and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need to transmit between entities.

Profiles or partial profiles provided by a profile provider to a CAS can contain any quantity of profile information, such as, in one example, just an online access IP address, STB IP address (not necessarily identified as such), STB identifier, or device pseudonym. The profile can include, e.g., a profile identifier or profile name, a username, or a login ID, or other online user interface device identifier; the profile can be referenced by or included in a cookie or tag placed on a user's online user interface device. The IP address can be provided by the profile provider itself or might be obtained by the CAS when a user engages in any online activity or provides an item of demographic information and is redirected by a profile provider to the CAS. In another example, a profile can be more extensive and can include demographic or online behavioral information, such as an extensive browsing history, shopping or purchase histories, content or programs viewed online, and other information concerning the user's characteristics or the user's activities. In some instances a profile includes PII (typically provided by the user); in other instances it does not.

The profile need not be stored in a single location; profile information that collectively defines a single user profile can be stored in one or more databases on one or more servers, in tags or cookies placed on one or more user interfaces devices, or at a combination of those locations. Although the profile provider is referenced in the previous several paragraphs as being an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually. Accordingly, as is common in the art, in some contexts, reference to a profile provider may refer to the computer systems or other equipment controlled by the entity rather than the entity itself.

Personally Identifiable Information (PII)—information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally-Identifiable Information (non-PII)—information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but does not by itself allow one knowing the information to identify the particular person.

Cookie—a text file placed on a user's computer by any server that also serves content of any type to the user's computer using browser software. That content can include, for example, an entire web page, only a portion of a web page, one or more images, or even a single pixel; the user need not be aware of every server that delivers such content, and in many cases is not (e.g., if that server delivers only a single-pixel image). The cookie typically can be read or altered only by a server operating under the same Internet domain as the server that originally placed the cookie. The cookie file can be used to identify a computer that has already been in contact with the same domain (e.g., it can act as an online user interface device identifier) and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. A cookie file can also be created, altered, or deleted by software located on the user's computer.

Television advertisement (TV ad)—a full screen video ad, a partial screen video ad, a banner ad, a text ad, an audio ad, or any other form of ad suitable for delivery to and visual or audible presentation by a television (as defined above), which includes any device for delivering television content. TV ads can be spatially juxtaposed with or overlaid on the television program (e.g., banner ads) or can be temporally interleaved with the television program (e.g., traditional 15-, 30-, or 60-second spot ads).

Redirect (or URL redirection or URL forwarding)—the process of a server instructing a browser or application running on a computer to obtain certain requested information (e.g., all or part of a web page) from a different location by (1) a first server providing a URL to the browser or application and (2) the computer using the received URL to electronically contact the URL address. The URL could be given to the computer in many ways, for example by embedding a pixel (1×1 image tag) in an HTML page or content, via iFrame or other frame redirects, via JavaScript, via a 302 HTTP status code (in HTTP protocol, or via other 3xx status codes) in response to a request received by the first server from the computer, via redirect services, or via electronic mail. In one example, the URL could be sent to the computer following the computer coming into contact with the first server in any way, for example, following the computer accessing the first server to receive content. In another example, the URL could be given to the computer from the first server via HTML electronic mail (in this example, the URL is sent without the computer coming into contact with the first server).

The TV ads directed to STBs at the request of a PP can come from a variety of sources. Likewise, online ads directed to online user interface devices can come from a variety of sources. In one example, a given PP can request that the CAS direct an advertisement to the user's STB or online user interface device from (or on behalf of) the PP itself (if, for example, the PP is an online advertiser site interested in delivering TV ads to people that visited its online site) or from another entity that sells ad space to advertisers, some of whom may desire to present ads to the PP site's presumed audience. In that example, the proprietor of the CAS, as the facilitator of the targeted ad delivery, can receive a payment from the PP. The CAS proprietor can keep a share of revenue as a commission and pay the TVCP for the ad space (except in the case where the CAS proprietor owns the ad space). The TVCP can either retain the entire amount paid by the CAS proprietor, if the TVCP owns the TV ad space within which the TV ad was delivered, or the TVCP can pay some or all of the amount paid by the CAS proprietor to another entity such as a TV broadcasting network (which might also be a TVCP), if the TVCP does not own the ad space.

In another example, the CAS can pay the TVCP for electronically associating the online user interface device and STB, pay a television ad space seller for the TV ad space, and pay an online site (or profile aggregator) for the use of its profile data in targeting the TV ad (unless the online site sold the TV ad or requested its delivery).

In still another example, the CAS can record which entity is entitled to what payments, and payments are made directly from the television ad space seller or television advertiser to the various entitled entities, based on the CAS's records.

In some cases, the CAS can be owned by a TVCP (that may or may not also be a STB provider), an ISP, an STB provider (that may or may not also be a TVCP), an online site, an advertiser, an advertising agency, an advertiser representative, an online ad space seller, a TV ad space owner, or a TV content provider, in which case the payments will be divided in accordance to the respective roles. In general, a payment from a TV advertiser is used to pay the TV ad space owner and the entities facilitating the delivery of the targeted TV ad.

In another example, the online site or other PP can request that a television ad be directed to the user's STB from another advertiser of its own choosing to whom the online site has sold an amount of television advertising space, or that an online ad be directed to the user's online user interface device from another advertiser of its own choosing to whom the PP has sold an amount of online advertising space. In that example the PP or online site can collect a revenue amount from the site-chosen advertiser while paying the CAS, ISP, TVCP, ISP/TVCP, or ad space owner(s) in return for assisting to facilitate delivery of the ad(s) provided by the site-chosen advertiser.

In another example, the PP provides a profile to the CAS in return for a payment triggered (1) every time the provided profile (whether including behavioral or demographic data) is used to deliver a TV ad, (2) when a TV ad that has been delivered using the provided profile generates revenues, (3) every time the provided profile (whether including behavioral or demographic data) is used to deliver an online ad, (4) when an online ad that has been delivered using the provided profile generates revenues, or (5) simply on account of delivery of the profile without regard to whether, how often, or how effectively it is used.

The TV or online advertisement itself can be sold by the CAS, ISP, TVCP, ISP/TVCP, STB provider, TV ad space owner, or any third party such as a reseller or a firm that represents ad space owners or PPs and sells to advertisers. In that example the PP can collect a revenue amount from any of the entities benefiting from the delivery of the TV or online ad based on the profile provided by the PP, including the ad space owner, STB provider, CAS, ISP, TVCP, ISP/TVCP, or a third party selling the targeted ad space. The PP, reseller, or the other advertisers can also pay a revenue amount to the CAS, ISP, TVCP, or ISP/TVCP in return for directing the ad to the STB.

A third party offline data provider, that provides a PP with offline data following the facilitation of a TVCP, an ISP, or other entity, could in one example receive a payment from the PP or any other entity benefiting from the usage of the offline data in targeting ads to an OD2 user, whether those ads are online ads on OD2 or television ads on a STB associated with OD2. In another example, the offline data provider pays the PP for associating the offline data with device OD2 thereby enabling usage of the offline data in targeting OD2 with online ads or targeting the OD2 user with television ads on a STB associated with OD2. The third party offline data provider could pay the PP for the association, when the data is used to target ads, when the ads targeted using the data generate any response (including sales), any combination of those payment methods, or any other compensation method.

The systems and methods disclosed herein can be used to generate revenue in a variety of ways for various of the involved entities, not limited to the examples given here, that fall within the scope of the present disclosure or appended claims. The terms "pay," "collect," "receive," and so forth, when referring to revenue amounts, can denote actual exchanges of funds or can denote credits or debits to electronic accounts, possibly including automatic payment implemented with computer tracking and storing of information in one or more computer-accessible databases. The terms can apply whether the payments are characterized as commissions, royalties, referral fees, holdbacks, overrides, purchase-resales, or any other compensation arrangements giving net results of split advertising revenues as stated above. Payment can occur manually or automatically, either immediately, such as through micro-payment transfers, periodically, such as daily, weekly, or monthly, or upon accumulation of payments from multiple events totaling above a threshold amount. The systems and methods disclosed herein can be implemented with any suitable accounting modules or subsystems for tracking such payments or receipts of funds.

Various actions or method steps characterized herein as being performed by a particular entity typically are performed automatically by one or more computers or computer systems under the control of that entity, whether owned or rented, and whether at the entity's facility or at a remote location. The methods disclosed here are typically performed using software of any suitable type running on one or more computers, one or more of which are connected to the Internet. The software can be self-contained on a single computer, duplicated on multiple computers, or distributed with differing portions or modules on different computers. The software can be executed by one or more servers, or the software (or a portion thereof) can be executed by an online user interface device used by the electronic visitor (e.g., a desktop or portable computer; a wireless handset, "smart phone," or other wireless device; a personal digital assistant (PDA) or other handheld device; a television or STB). Software running on the visitor's online user interface device can include, e.g., Java™ client software or so-called adware. Some methods can include downloading such software to an electronic visitor's online user interface device to perform there one or more of the methods disclosed herein.

The profile information described can be included as a portion of the tags or cookies placed on a visitor's device, or the tags or cookies can merely include an identifier associated with the visitor's profile that is stored elsewhere (e.g., in a database on a profile owner server, profile supplier server, or media property server). The profile information need not be stored in a single location or under the control of a single entity, nor does control or use of the profile information need to be performed at a single location or under control of a single entity.

The systems and methods disclosed herein can be implemented as general or special purpose computers or servers or other programmable hardware devices programmed through software, or as hardware or equipment "programmed" through hard wiring, or a combination of the two. A "computer" (e.g., a "server" or an online user interface device) can comprise a single machine or processor or can comprise multiple interacting machines or processors (located at a single location or at multiple locations remote from one another). A computer-readable medium can be encoded with a computer program, so that execution of that program by one or more computers causes the one or more computers to perform one or more of the methods disclosed herein. Suitable media can include temporary or permanent storage or replaceable media, such as network-based or Internet-based or otherwise distributed storage of software modules that operate together, RAM, ROM, CD ROM, CD-R, CD-RAN, DVD ROM, DVD±R, DVD±R/W, hard drives, thumb drives, flash memory, optical media, magnetic media, semiconductor media, or any future storage alternatives. Such media can also be used for databases recording the information described above.

Specific Examples

The following examples fall within the scope of the present disclosure or appended claims. None of the following examples are intended to limit the scope of the present disclosure or any appended claim.

A multiple-viewer display can in some instances be an HDTV, projector, or display connected to or part of an entertainment-oriented device (EOD) such as a game console or a so-called "Over The Top" device (OTT; examples include Apple TV® or Roku®; Apple TV®, Roku®, or other EOD can sometimes also act as a STB or an online device); such devices are often used by more than one household member or business member. Presentation of media content using a multiple-viewer display does not necessarily imply that multiple viewers are watching the screen simultaneously; a multiple-viewer display can be viewed by one or more viewers.

In one example, a DLNA-certified laptop streams an action movie video to a DLNA-certified television (DLNA is an abbreviation for the Digital Living Network Alliance). In one implementation, a server streaming the movie to the laptop can recognize a request from the laptop to switch to streaming at higher video resolution (compared to the laptop display's native resolution), the request indicating that the laptop has switched to streaming the media content to a multiple-viewer display. In another implementation, the streaming server can place or modify a cookie on the laptop; that cookie can store information, or act as a record locator for information stored in a central database, which information includes the display resolution used by the laptop to receive video content from the server. If higher video resolution is requested by that laptop on a later date, the server can infer use of a multiple-viewer display. In still another implementation, software on the laptop can recognize streaming or sending media content to a multiple-viewer display or to another device connected (or assumed to be connected) to a multiple-viewer display.

In another example, a central ad server collects the following information: an Android™ mobile smartphone was used in the last two weeks to check where an action movie appears in theaters (theaters located near the laptop current location) and is currently sharing a household LAN with the laptop that is currently being used to view an action movie that the laptop is streaming to a television (i.e., a multiple-viewer display). As a result the central ad server associates the Android™ mobile phone and the laptop (based on the sharing of the household LAN within the last hour, for example) and also concludes that it is likely that the Android™ mobile phone user is the one watching the action movie on the laptop via the multiple-viewer display, because both devices are used for consuming, or finding information about, the same movie genre (action genre in this example). The server does not necessarily conclude that the laptop is owned by the Android™ mobile phone user; the laptop could have been borrowed from another household member to view the movie. The central ad server selects a Geico™ car insurance advertisement based on a search for car insurance that took place via the Android™ mobile phone earlier in the day (e.g., search information can be collected by the central ad server by receiving the information from a mobile search application installed on the mobile phone or from a web site visited using the mobile phone) and arranges for the advertisement to be delivered to the laptop, to appear on the multiple-viewer display, the laptop display, or both. The advertisement can be of any suitable type or format, including but not limited to: a 30 second video commercial appearing within a so-called ad pod break during the action movie, an advertisement overlaid on the action movie, or a banner appearing only on the bottom of the laptop screen.

A single-viewer display can be recognized if media content is presented on the device screen of the receiving device, such as the screen of a laptop, tablet, or smartphone. If a receiving device has an additional display connected to it, then in one example the mere transmission of media content for presentation on the second display can be interpreted as recognition of use of a multiple-viewer display. In another example, an assumption that the second screen is a multi-viewer display can further depend on the size or resolution of the second screen, or the manner in which media content is transmitted to the second screen via a cable or over a network, (e.g., using which type of cable, using the knowledge of over which network). In one example, if a receiving device transmits media content to a second device using AirPlay® over WiFi, it can be inferred that the second device (possibly an Apple TV®) is connected to or part of a multiple-viewer display.

In one example, a user of a selecting device (e.g., a tablet computer) is the only viewer watching media content streamed to a larger presenting device (e.g., a nearby flatscreen television). The media content can be streamed from the selecting device, which also acts as the receiving device, or from a server to which the selecting device pointed the presenting device to receive the media, in which case the presenting device also acts as the receiving device. In this example, although it might be assumed that the tablet is used mainly by one user, any household member or guest (including the main tablet user) might have used the tablet for viewing media content on a larger screen. In another example, a household member or guest might join the main tablet user to watch the media content on the larger screen.

In a different example, an entertainment-oriented device such as Apple TV®, Roku®, or a game console, or another STB or online device that might be considered entertainment-oriented based on usage (e.g., for activities such as playing games, watching video, listening to music, etc.), can be used by the user to select the viewed media (rather than receiving media delivered from another device where the received media was selected by the user for viewing on the other device). Media viewed via such entertainment-oriented devices can be considered to be viewed on a multiple-viewer display. Advertisements included in the media content delivered to those devices can be selected based on profiles associated with devices associated with the entertainment-oriented device. A device can be associated with the entertainment-oriented device based on being connected to a common household LAN at some point in time, because the entertainment-oriented device was used for presenting media content selected using the other device, or by any of the ways described above or in the applications and patents incorporated herein.

In one example of the preceding scenario, an Apple TV® is used to select and view a YouTube® video on an attached HDTV display. An advertisement is selected by a central ad server working with YouTube® (or an ad server operated by YouTube® or an affiliate of YouTube®) based on a profile associated with a smartphone that earlier used the Apple TV® to view an online movie on the HDTV display (the online movie was streamed from a web server to the smartphone and from the smartphone sent to the Apple TV® in this example). In one possible implementation of this example, the smartphone reported the Apple TV® ID to the central ad server (via redirect from the online movie streaming web server for example) at the time it was streaming the movie to the Apple TV®. The central ad server recorded the Apple TV® ID along with the smartphone IP address (which represents the household LAN IP address) when the online movie was delivered from the smartphone to the Apple TV® over the household LAN. The central ad server further records searches conducted and content read by the smartphone in different locations and different times along with a cookie ID (or other tag) of the smartphone (if the smartphone accepts cookies or can be recognized with another tag, combination of tags, or a device fingerprint). If the smartphone rejects cookies and is not recognizable by tags or a device fingerprint, the central ad server records searches conducted by and content read by the smartphone and associates them with a smartphone operating from the household IP address (in this case recording only those searches conducted or content visited while the smartphone was using the household LAN). The central ad server recognizes the Apple TV® ID (assuming it was reported by the Apple TV®), the usage of an Apple TV® device, or the household LAN IP address and delivers the selected advertisement via YouTube® or along with the YouTube® content to the Apple TV®.

In another example, an entertainment-oriented device such as the Apple TV® is used by an iPhone® to stream a comedy to the HDTV screen connected to the Apple TV®. Later, an online device such as an iPad® (tablet computer) uses the entertainment-oriented device to also watch a comedy. Advertisements sent to the iPad® along with the comedy or as part of the comedy stream can be targeted based on profile information collected during use of a mobile browser or other mobile application and associated with the iPhone® since it is likely that the iPhone® and the iPad® users are the same person (because both devices were used to view a comedy in the same household using the same entertainment-oriented device). In another alternative, the entertainment-oriented device (such as an Apple TV® or STB or other) can be used to insert ads into the media content received from the iPad® based on profiles of other ODs that earlier used the entertainment-oriented device to stream content to the HDTV. The advertisements can be inserted by the entertainment-oriented device into the streamed content to replace ads sent by the iPad® or in addition to the ads sent by the iPad, or the entertainment-oriented device can be the only source of ads if no ads are sent by the iPad®. In one possible implementation, software running on the entertainment-oriented device can recognize other devices (such as an iPhone®, iPad®, or other) streaming content through that device and report the device's ID or type of device and the streamed content to a central server; that server can later use that information to recognize which of the users of associated devices is likely using the entertainment-oriented device; customized ads can then be sent to the entertainment-oriented device based on the profile associated with the recognized user's device. In another example, a central ad server can select ads to be delivered to an entertainment-oriented device that is used to select and view a comedy; the ads can be selected at least in part based on a profile of a tablet that used the entertainment-oriented device previously to view a comedy. In other words, the central ad server can infer that the selection and viewing of the comedy on the entertainment-oriented device is done by the same user who selected a comedy on a tablet and viewed it via the entertainment-oriented device. More generally, media content or ads sent to the entertainment-oriented device can be customized based on the profiles associated with ODs that earlier used the entertainment-oriented device to stream media content. The use of the profiles can be conditioned on those ODs being recognized as nearby or estimated to be nearby (as described above).

It is intended that equivalents of the disclosed exemplary embodiments and methods shall fall within the scope of this disclosure or appended claims. It is intended that the disclosed exemplary embodiments and methods, and equivalents thereof, may be modified while remaining within the scope of this disclosure or appended claims.

In the foregoing Detailed Description, various features may be grouped together in several exemplary embodiments or examples for the purpose of streamlining the disclosure. However, inventive subject matter may lie in less than all features of a single disclosed exemplary embodiment. No feature should be considered "essential" or "necessary" absent express reference to that effect. The present disclosure shall also be construed as implicitly disclosing any embodiment having any suitable combination of disclosed features or examples (i.e., combinations of features or examples that are not incompatible or mutually exclusive) that appear in the present disclosure, including those combinations of features or examples that may not be explicitly disclosed herein in a stated combination.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

If the provisions of 35 USC §112 ¶6 are desired to be invoked in any apparatus claim associated herewith, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

What is claimed is:

1. A method implemented using a programmed hardware computer system, the method comprising:
   (a) using the computer system, selecting, based at least in part on a display type, a user profile from among a set of user profiles that are associated with respective devices of a set of two or more online devices associated with one another based on proxy location, which set includes a content-selecting device, wherein the selected user profile is not associated with the content-selecting device;
   (b) wherein the selection of the user profile is based at least in part on an identified correlation between (i) a time period during which the received media content is presented and (ii) previous specific time periods during which the corresponding online device was estimated to have been at the proxy location;
   (c) using the computer system, causing a television advertisement to be (i) selected, based on the selected user profile, and (ii) directed to a content-receiving device;
   (d) wherein the display type of part (a) is the display type of a display, which display is inferred to be suitable for viewing by multiple viewers, that is used to present the television advertisement in combination with media content selected by the content-selecting device and received by the content-receiving device; and
   (e) wherein the device association based on proxy location of part (a) is indicated by stored electronic indicia generated as a result of one or more online devices of the set being estimated to have been at a location shared with the content-selecting device.

2. The method of claim 1 wherein the content-receiving device and the content-selecting device are the same online device.

3. The method of claim 1 wherein the causing of part (c) comprises, using the computer system, selecting the television advertisement based on the selected user profile and directing the selected television advertisement to the content-receiving device for presentation in combination with the media content.

4. The method of claim 1 wherein inferring the suitability of the display for viewing by multiple viewers is based on identifying that the media content is received or presented via a set-top box.

5. The method of claim 1 wherein inferring the suitability of the display for viewing by multiple viewers is based on identifying that the media content is received or presented via an entertainment-oriented device.

6. The method of claim 1 wherein inferring the suitability of the display for viewing by multiple viewers is based on identifying that the received media content is streamed over a local computer network to a content-presenting device.

7. The method of claim 1 further comprising, using the computer system, selecting a second television advertisement, different from the first television advertisement, to be directed to and presented by the content-selecting device or the content-receiving device using a dedicated display thereof during presentation of the received media content using the multiple-viewer display, wherein the second television advertisement is selected based at least in part on information in the user profile associated with the device used to present the second television advertisement.

8. The method of claim 1 wherein the stored electronic indicia comprise data generated as a result of the online devices of the set sharing a connection to the Internet at the shared location.

9. The method of claim 1 wherein the stored electronic indicia comprise data generated as a result of the online devices of the set sharing an estimated geographic location at the shared location.

10. The method of claim 1 further comprising, using the computer system, inferring the suitability of the display for viewing by multiple viewers based on screen resolution of the display or of the received media content.

11. A machine comprising a hardware computer system structured and programmed to perform a method comprising:
    (a) using the computer system, selecting, based at least in part on a display type, a user profile from among a set of user profiles that are associated with respective devices of a set of two or more online devices associated with one another based on proxy location, which set includes a content-selecting device, wherein the selected user profile is not associated with the content-selecting device;
    (b) wherein the selection of the user profile is based at least in part on an identified correlation between (i) a time period during which the received media content is presented and (ii) previous specific time periods during which the corresponding online device was estimated to have been at the proxy location;
    (c) using the computer system, causing a television advertisement to be (i) selected, based on the selected user profile, and (ii) directed to a content-receiving device;
    (d) wherein the display type of part (a) is the display type of a display, which display is inferred to be suitable for viewing by multiple viewers, that is used to present the television advertisement in combination with media content selected by the content-selecting device and received by the content-receiving device; and
    (e) wherein the device association based on proxy location of part (a) is indicated by stored electronic indicia generated as a result of one or more online devices of the set being estimated to have been at a location shared with the content-selecting device.

12. The machine of claim 11 wherein the method performed by the machine comprises inferring the suitability of the display for viewing by multiple viewers is based on identifying that the media content is received or presented via a set-top box.

13. The machine of claim 11 wherein the method performed by the machine comprises inferring the suitability of the display for viewing by multiple viewers is based on identifying that the media content is received or presented via an entertainment-oriented device.

14. The machine of claim 11 wherein the method performed by the machine comprises inferring the suitability of the display for viewing by multiple viewers is based on identifying that the received media content is streamed over a local computer network to a content-presenting device.

15. The machine of claim 11 wherein the method performed by the machine further comprises, using the computer system, selecting a second television advertisement, different from the first television advertisement, to be directed to and presented by the content-selecting device or the content-receiving device using a dedicated display thereof during presentation of the received media content using the multiple-viewer display, wherein the second television advertisement is selected based at least in part on information in the user profile associated with the device used to present the second television advertisement.

16. The machine of claim 11 wherein, in the method performed by the machine, the stored electronic indicia comprise data generated as a result of the online devices of the set sharing a connection to the Internet at the shared location.

17. The machine of claim 11 wherein, in the method performed by the machine, the stored electronic indicia comprise data generated as a result of the online devices of the set sharing an estimated geographic location at the shared location.

18. The machine of claim 11 wherein the method performed by the machine further comprises, using the computer system, inferring the suitability of the display for viewing by multiple viewers based on screen resolution of the display or of the received media content.

19. An article comprising a tangible medium that is not a transitory propagating signal encoding computer-readable instructions that, when applied to a computer system, instruct the computer system to perform a method comprising:
   (a) using the computer system, selecting, based at least in part on a display type, a user profile from among a set of user profiles that are associated with respective devices of a set of two or more online devices associated with one another based on proxy location, which set includes a content-selecting device, wherein the selected user profile is not associated with the content-selecting device;
   (b) wherein the selection of the user profile is based at least in part on an identified correlation between (i) a time period during which the received media content is presented and (ii) previous specific time periods during which the corresponding online device was estimated to have been at the proxy location;
   (c) using the computer system, causing a television advertisement to be (i) selected, based on the selected user profile, and (ii) directed to a content-receiving device;
   (d) wherein the display type of part (a) is the display type of a display, which display is inferred to be suitable for viewing by multiple viewers, that is used to present the television advertisement in combination with media content selected by the content-selecting device and received by the content-receiving device; and
   (e) wherein the device association based on proxy location of part (a) is indicated by stored electronic indicia generated as a result of one or more online devices of the set being estimated to have been at a location shared with the content-selecting device.

20. The article of claim 19 wherein the content-receiving device and the content-selecting device are the same online device.

21. The article of claim 19 wherein the causing of part (c) comprises, using the computer system, selecting the television advertisement based on the selected user profile and directing the selected television advertisement to the content-receiving device for presentation in combination with the media content.

22. The article of claim 19 wherein the method instructed by the computer-readable instructions further comprises, using the computer system, selecting a second television advertisement, different from the first television advertisement, to be directed to and presented by the content-selecting device or the content-receiving device using a dedicated display thereof during presentation of the received media content using the multiple-viewer display, wherein the second television advertisement is selected based at least in part on information in the user profile associated with the device used to present the second television advertisement.

* * * * *